(12) United States Patent
Harrison

(10) Patent No.: US 8,555,244 B2
(45) Date of Patent: *Oct. 8, 2013

(54) SYSTEMS AND METHODS FOR MONITORING A COMPUTING ENVIRONMENT

(75) Inventor: Guy Harrison, Irvine, CA (US)

(73) Assignee: Dell Software Inc., Aliso Viejo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/467,424

(22) Filed: May 9, 2012

(65) Prior Publication Data

US 2012/0222002 A1    Aug. 30, 2012

Related U.S. Application Data

(63) Continuation of application No. 12/860,159, filed on Aug. 20, 2010, now Pat. No. 8,181,154, which is a continuation of application No. 11/121,523, filed on May 4, 2005, now Pat. No. 7,784,027, which is a continuation of application No. 09/695,609, filed on Oct. 23, 2000, now Pat. No. 6,901,582.

(60) Provisional application No. 60/167,326, filed on Nov. 24, 1999.

(51) Int. Cl.
    *G06F 9/44* (2006.01)
(52) U.S. Cl.
    USPC .......................................................... 717/113
(58) Field of Classification Search
    USPC .......................................... 717/110, 111, 113
    See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |
| 5,539,907 A | 7/1996 | Srivastava et al. |
| 5,572,640 A | 11/1996 | Schettler |

(Continued)

OTHER PUBLICATIONS

U.S. Appl. No. 13/745,677, Ostermeyer.

(Continued)

*Primary Examiner* — Anna Deng
(74) *Attorney, Agent, or Firm* — Winstead PC

(57) ABSTRACT

The invention comprises a system and method for monitoring the performance of an application. The invention includes a monitoring system graphical user interface (GUI) having an interactive window with on-screen graphics representative of the application architecture and component performance. The GUI comprises straightforward and intuitive icons, panels, and dataflows, representing the existence, capacity, or number of processes, memory structures, and the like of the application being monitored. In addition, the monitoring system includes an alert firing mechanism and process for alerting an administrator to potential or actual performance problems in the application.

18 Claims, 15 Drawing Sheets

(56) References Cited

U.S. PATENT DOCUMENTS

| | | | |
|---|---|---|---|
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard, II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,173,322 B1 | 1/2001 | Hu |
| 6,195,092 B1 | 2/2001 | Dhond et al. |
| 6,199,199 B1 | 3/2001 | Johnston et al. |
| 6,243,105 B1 | 6/2001 | Hoyer et al. |
| 6,330,008 B1 | 12/2001 | Razdow et al. |
| 6,351,754 B1 | 2/2002 | Bridge et al. |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,901,582 B1 | 5/2005 | Harrison |
| 6,993,454 B1 | 1/2006 | Murstein et al. |
| 7,103,843 B2 | 9/2006 | Hand et al. |
| 7,127,324 B2 | 10/2006 | Batori et al. |
| 7,274,375 B1 | 9/2007 | David |
| 7,363,211 B1 | 4/2008 | Naganathan et al. |
| 7,480,647 B1 | 1/2009 | Murstein et al. |
| 7,480,866 B2 | 1/2009 | Germain et al. |
| 7,512,888 B2 | 3/2009 | Sugino et al. |
| 7,532,642 B1 | 5/2009 | Peacock |
| 7,557,803 B2* | 7/2009 | Furukawa et al. | 345/420 |
| 7,587,492 B2 | 9/2009 | Dyck et al. |
| 7,620,984 B2 | 11/2009 | Kallahalla et al. |
| 7,685,251 B2 | 3/2010 | Houlihan et al. |
| 7,784,027 B2 | 8/2010 | Harrison |
| 7,792,941 B2 | 9/2010 | Fried et al. |
| 7,882,216 B2 | 2/2011 | Houlihan et al. |
| 7,917,617 B1 | 3/2011 | Ponnapur et al. |
| 7,979,245 B1 | 7/2011 | Bourlatchkov et al. |
| 8,051,162 B2 | 11/2011 | Arlitt et al. |
| 8,051,382 B1 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,175,862 B1 | 5/2012 | Bourlatchkov et al. |
| 8,175,863 B1 | 5/2012 | Ostermeyer et al. |
| 8,181,154 B2 | 5/2012 | Harrison |
| 8,185,598 B1 | 5/2012 | Golovin et al. |
| 8,217,945 B1 | 7/2012 | Moscovici |
| 8,239,526 B2 | 8/2012 | Simpson et al. |
| 8,255,516 B1 | 8/2012 | Zhang et al. |
| 8,364,460 B2 | 1/2013 | Ostermeyer et al. |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0126256 A1 | 7/2003 | Cruickshank et al. |
| 2003/0149753 A1 | 8/2003 | Lamb |
| 2003/0225563 A1 | 12/2003 | Gonos |
| 2004/0006763 A1* | 1/2004 | Van De Vanter et al. | 717/110 |
| 2004/0012637 A1 | 1/2004 | Alford, Jr. et al. |
| 2004/0030592 A1 | 2/2004 | Buck et al. |
| 2004/0059812 A1 | 3/2004 | Assa |
| 2004/0102925 A1 | 5/2004 | Giffords |
| 2005/0021743 A1 | 1/2005 | Fleig et al. |
| 2005/0111352 A1 | 5/2005 | Ho et al. |
| 2006/0173875 A1 | 8/2006 | Stefaniak |
| 2007/0043860 A1 | 2/2007 | Pabari |
| 2007/0226341 A1 | 9/2007 | Mateo |
| 2007/0255814 A1 | 11/2007 | Green et al. |
| 2008/0077366 A1 | 3/2008 | Neuse et al. |
| 2008/0155537 A1 | 6/2008 | Dinda et al. |
| 2008/0222633 A1 | 9/2008 | Kami |
| 2008/0320269 A1 | 12/2008 | Houlihan et al. |
| 2009/0150538 A1 | 6/2009 | Tripathi et al. |
| 2009/0172666 A1 | 7/2009 | Yahalom et al. |
| 2009/0199177 A1 | 8/2009 | Edwards et al. |
| 2009/0222558 A1 | 9/2009 | Xu et al. |
| 2009/0241108 A1 | 9/2009 | Edwards et al. |
| 2009/0300605 A1 | 12/2009 | Edwards et al. |
| 2010/0114554 A1 | 5/2010 | Misra |
| 2010/0125665 A1 | 5/2010 | Simpson et al. |
| 2010/0229096 A1 | 9/2010 | Maiocco et al. |
| 2010/0325273 A1 | 12/2010 | Kudo |
| 2011/0047496 A1 | 2/2011 | Harrison |
| 2011/0119748 A1 | 5/2011 | Edwards et al. |
| 2011/0161851 A1 | 6/2011 | Barber et al. |
| 2011/0209146 A1 | 8/2011 | Box et al. |
| 2011/0254704 A1 | 10/2011 | Fournier et al. |
| 2011/0302577 A1 | 12/2011 | Reuther et al. |
| 2012/0030346 A1 | 2/2012 | Fukuda et al. |
| 2012/0221314 A1 | 8/2012 | Bourlatchkov et al. |

OTHER PUBLICATIONS

Template Software, Workflow Template Process Template, "Developing a WFT Workflow System", 1997, whole manual.

Partridge C. et al. Fire State Message Protocol Specification, BBN Technologies, Jul. 12, 2000, (pp. 1-19).

"Instance Monitor The Real-Time Database Monitoring and Diagnostic Solution for Oracle," Brochure, Quest Software, Inc. 1999, 2 pages.

Boucher et al., Essential Guide to Object Monitors, Mar. 1999, whole book.

Dewan, et al. "A High-Level and Flexible Framework for Implementing Multiuser User Interfaces", 1992, ACM, p. 345-380.

Distributed Management Task Force, Inc., "Common Information Model (CIM) Infrastructure Specification"; Version 2.3 Final; Oct. 4, 2005; 102 pages.

Harrison, Guy, "Building a High-Perfornance Oracle Database Server," and "Tuning the Database Server," in: "Oracle SQL High-Performance Tuning," (New Jersey. Prentice-Hall, 1997), pp. 363-364, 399-400.

Hitachi TP Broker User's Guide, Release 3.1, 1998, entire manual.

Laessig; "Score Big with JSR 77, the J2EE Management Specification", Javaworld; Jun. 14, 2002; 8 pages.

Muller, Focus on HP OpenView: A Guide to Hewlett Packard's Network Management Platform, 1995, entire book.

Savant Corporation, "Products," http://www.savant-corp.com/prods.html, 1 page downloaded from the World Wide Web on Nov. 16, 1999.

Savant Corporation, "Products," http://www.savant-corp.com/prods.html, 1 page, downloaded and printed from the World Wide Web on Feb. 15, 2000.

Savant Corporation, "Q Application Diagnostics," http:///savant-corp.com/qappd.html, 1 page, downloaded and printed from the World Wide Web on Nov. 16, 1999.

(56) References Cited

OTHER PUBLICATIONS

Savant Corporation, "Q Hot SQL," http:///www.savant-corp.com/qhsql.html, 1 page, downloaded and printed from the World Wide Web on Nov. 16, 1999.

Savant Corporation, "Q Instance Overview," http:///www.savant-corp.com/qiov.html, 1 page, downloaded and printed from the World Wide Web on Nov. 16, 1999.

Savant Corporation, "Q Job Queue Manager," http:///www.savant-corp.com/qjobq.html, 1 page, downloaded and printed from the World Wide Web on Nov. 16, 1999.

Savant Corporation, "Q Lock Manager," http:///www.savant-corp.com/qlock.html, 1 page, downloaded and printed from the World Wide Web on Nov. 16, 1999.

Savant Corporation, "Q Replay Viewer," http:///www.savant-corp.com/qreplay.html, 1 page downloaded and printed from the World Wide Web on Nov. 16, 1999.

Singh et al; "Designing Web Services with the JDEE™ 1.4 Platform," Chapter 6 (pp. 247-289), May 2004; 46 total pages.

Tang, et al. "Blending Structured Graphics and Layout", 1994, ACM, p. 167-174.

Aug. 6, 2012 Listing of Related Applications of Assignee.

\* cited by examiner

SYSTEMS AND METHODS FOR MONITORING A COMPUTING ENVIRONMENT

REFERENCE TO RELATED APPLICATIONS

This application is a continuation of U.S. patent application Ser. No. 12/860,159, filed Aug. 20, 2010, which is a continuation of U.S. patent application Ser. No. 11/121,523, filed May 4, 2005, now U.S. Pat. No. 7,784,027, issued Aug. 24, 2010, which is a continuation of U.S. patent application Ser. No. 09/695,609, filed Oct. 23, 2000, now U.S. Pat. No. 6,901,582, issued May 31, 2005, which claims priority to U.S. Provisional Application No. 60/167,326, entitled "SYSTEM AND METHOD FOR MONITORING DATA FLOW," filed Nov. 24, 1999, each of which is hereby incorporated herein by reference in its entirety.

BACKGROUND OF THE INVENTION

1. Field of the Invention

This invention relates in general to a monitoring system for monitoring the performance of computer systems, and in particular, to the graphical monitoring of groups of the performance data.

2. Description of the Related Art

Information technology specialists, often called system administrators, are responsible for maintaining, managing, protecting and configuring computer systems and their resources. More and more, such maintenance includes ensuring multiple users local and remote access to vast resources of data over a great number of computer applications and systems, including the Internet. Moreover, system administrators are asked to provide access to these highly reliable systems at practically any time of any day while ensuring the system's integrity is not threatened by dataflow bottlenecks or excessive overhead.

To aid administrators in ensuring accessibility and system integrity, computer systems generally provide performance data in the form of performance reports, query-accessible tables, printouts, and the like. However, as system complexity increases, these reports and tabular data become increasingly difficult for the administrator to fully process and comprehend. In addition, bottlenecks caused by user overload, improper application configurations, and the like, can happen relatively quickly, and tabular data typically does not lend itself well to quickly locating and addressing potential or actual problems.

One solution for monitoring of the performance of computer systems included a graphical system for representing the active processes on a computer network. In the graphical system, various graphical objects represent differing characteristics of each network process. The various graphical objects change their attributes, such as shape, color, rotation, texture, and movement, as the corresponding process changes its characteristics.

However, these types of graphical systems suffer from drawbacks similar to the conventional performance reports and tabular data. For example, the foregoing graphical system represents each active process and its changing characteristics with numerous on-screen graphics. Moreover, each of the numerous on-screen graphics changes its graphical attributes as its corresponding process changes characteristics. As the complexity of computer systems increase, such individual representations overload the available graphic area and create confusion and difficulty in quickly and efficiently identifying actual or potential data bottlenecks or improper system parameter configurations.

SUMMARY OF THE INVENTION

Therefore, one aspect of the present invention provides a straightforward, efficient, and intuitive monitoring system for monitoring the performance of a computer system. In addition, another aspect provides a monitoring system that groups similar performance data such that the grouping may be efficiently monitored and potential or actual bottlenecks or improper configurations may be detected. According to yet another aspect of the invention, the monitoring system incorporates a graphical user interface representative of the underlying application architecture, thereby providing an immediately understandable representation of the application's fundamental components and their interaction.

Another aspect of the invention is a computer program for monitoring the performance of an application by presenting a visual map of the underlying architectural components of the application and the data flow between the architectural components.

The computer program comprises software configured to display a visual map having on-screen graphics representing components and data flows of an application. The computer program also includes at least some of the on-screen graphics representing components having similar functionality being organized into groups, while other on-screen graphics represent the data flowing between the groups. The computer program thereby provides a user with a snapshot overview of the performance of the application.

Accordingly, one aspect of the invention is a method of monitoring a computer program having a plurality of components. The method comprises grouping a plurality of performance data to form an on-screen graphic. The performance data represents the performance of a plurality of program components. The method further includes changing a graphical attribute of the on-screen graphic when a value of the group of performance data corresponds to a threshold.

Another aspect of the invention is a method of monitoring an application program having a plurality of components. The method comprises grouping a first plurality of performance data to form a first on-screen graphic. The first performance data represents the performance of a first plurality of program components of an application program. The method further includes grouping a second plurality of performance data to form a second on-screen graphic, wherein the second performance data represents the performance of a second plurality of program components of the application program. The method also includes grouping the first and second on-screen graphics into a third on-screen graphic, and changing a graphical attribute of one of the first and second on-screen graphics when a value of the corresponding group of performance data corresponds to a threshold.

Another aspect of the invention is a method of monitoring the performance of a computer program having a plurality of components. The method comprises grouping a first plurality of performance data to form a first on-screen graphic, wherein the first performance data represents the performance of a first plurality of program components of a computer program. The method also comprises grouping a second plurality of performance data to form a second on-screen graphic, wherein the second performance data represents the performance of a second plurality of program components of the computer program. The method further includes representing data flowing from the first plurality of program components to the second plurality of program components with an third on-screen graphic and changing a graphical attribute of the third on-screen graphic when a value of the data flow corresponds to a threshold.

Another aspect of the invention is a method of alerting a user to a potential problem within an application program. The method comprises accessing with a monitoring program, performance data representing at least one performance parameter of a monitored program and comparing the at least one performance parameter to a threshold value associated with the at least one performance parameter. The method also includes accessing a hierarchical set of severity levels to alert a user of the monitoring program, wherein the user is alerted with a first severity level when a threshold value is met and a lesser severity level when the threshold value is not met.

Another aspect of the invention is a monitoring system for monitoring a computer program. The monitoring system comprises a display having a window, an on-screen graphic, displayed in the window and representing a plurality of performance statistics corresponding to a plurality of components of a computer program. The monitoring system also comprises a severity protocol, associated with the on-screen graphic and configured to set a graphical attribute of the on-screen graphic, where the graphical attribute efficiently communicates to a user, the potential or actual existence of performance inhibitors associated with the computer program.

BRIEF DESCRIPTION OF THE DRAWINGS

The present invention is described in more detail below in connection with the attached drawings, which are meant to illustrate and not limit the invention, and in which.

DETAILED DESCRIPTION OF THE PREFERRED EMBODIMENTS

Figure 1A:
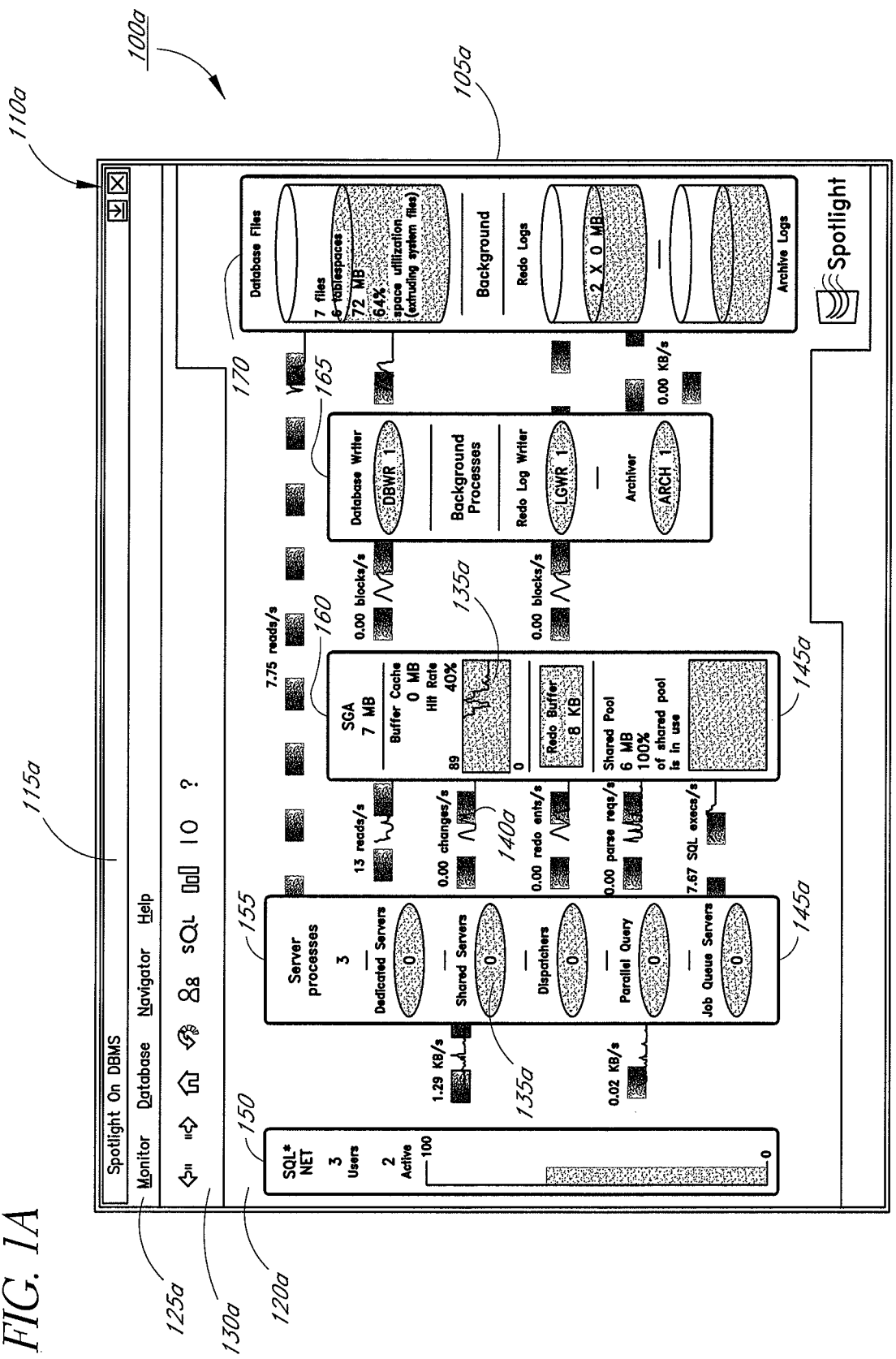
FIGS. 1A-1E illustrate various monitoring system graphical user interfaces (GUI) according to aspects of embodiments of the invention.

The present invention is a monitoring system for monitoring the performance of an application. According to one embodiment, the monitoring system includes a graphical user interface (GUI) having an interactive window displaying on-screen graphics. The on-screen graphics may group performance data from similar functioning application components such that the on-screen graphics provide an efficient and intuitive view of the performance of at least the major components of the monitored application, and the interactions between those components. According to another embodiment, the interactive window provides a straightforward, efficient, intuitive view of the user input, output, overhead and user processes, the flow of data, available capacity, and the like, associated with the monitored application. In addition, the monitoring system alters the attributes of the on-screen graphics according to performance statistics related to the performance of the underlying application components.

According to yet another embodiment, the interactive window and the alteration of the attributes of the on-screen graphics, provide an administrator a snapshot overview of the performance of the monitored application. This snapshot overview allows the administrator to quickly pinpoint actual or potential problems with the application. Through this process, the administrator can correct for inefficiencies, bottlenecks, or overloads in the application, and thereby ensure the integrity of the system.

TERM DEFINITIONS

In this detailed description, the following terms are found throughout and are to be construed according to the following definitions.

An "application" refers to a computer program. While the monitoring system, and the computer program being monitored, the operating system, utilities, and the like, can all be considered applications, for clarity, this detailed description will only refer to the computer program being monitored as "the application."

"Application components" refer to the interacting software modules, functions, processes, or logical or physical structures through which the application passes data and performs tasks. The number and configuration of the application components often determines the performance of the application.

"Performance statistics" refers to a measurement of one or more characteristics of one or more of the application components An "On-screen graphic" refers to an item displayed in a monitoring system GUI. The item may include text and/or graphics. In addition, the text and/or graphics may have attributes that convey information, such as, for example, dataflow rates, user activity, overhead, and the architectural layout of the application and the application components.

A "Metric" refers to a value of one or a combination of performance statistics.

A "Threshold" refers to a range into which the metric may fall.

A "Severity" refers to an action associated with the metric being within a predetermined threshold. The actions may include, but are not limited to, updating or modifying one of the graphical attributes of an on-screen graphic.

REFERENCE TO THE FIGURES

To facilitate a complete understanding of the invention, the remainder of the detailed description describes the invention with reference to the figures, wherein like elements are referenced with like numerals throughout.

FIGS. 1A-1E illustrate various embodiments of monitoring system GUIs 100, according to aspects of the invention. The GUIs 100 govern the way in which a user and the monitoring systems interact. For example, the user may wish to input commands to the monitoring systems, while the monitoring systems provide both feedback of the user commands and provide a summary of the current and past performance of the respective applications being monitored.

According to one embodiment, the GUI 100 advantageously represents the architecture of the application being monitored. For example, the GUI 100 may represent the major application components and groups of components governing data and process flows. For example, FIG. 1A illustrates a GUI 100*a* for displaying the performance of the application components of a relational or other database management system, such as, for example, those commercially available from Oracle or IBM. Because the instant invention is relevant to, among other things, a wide number of database platforms, including database management systems (DBMS) and relational DBMSs (RDBMS) systems, these platforms and systems will hereinafter simply be referred to as "DBMS." As used herein, a DBMS generally comprises a set of programs enabling a user to enter, edit, delete, and organize select data in a database.

Figure 1B:
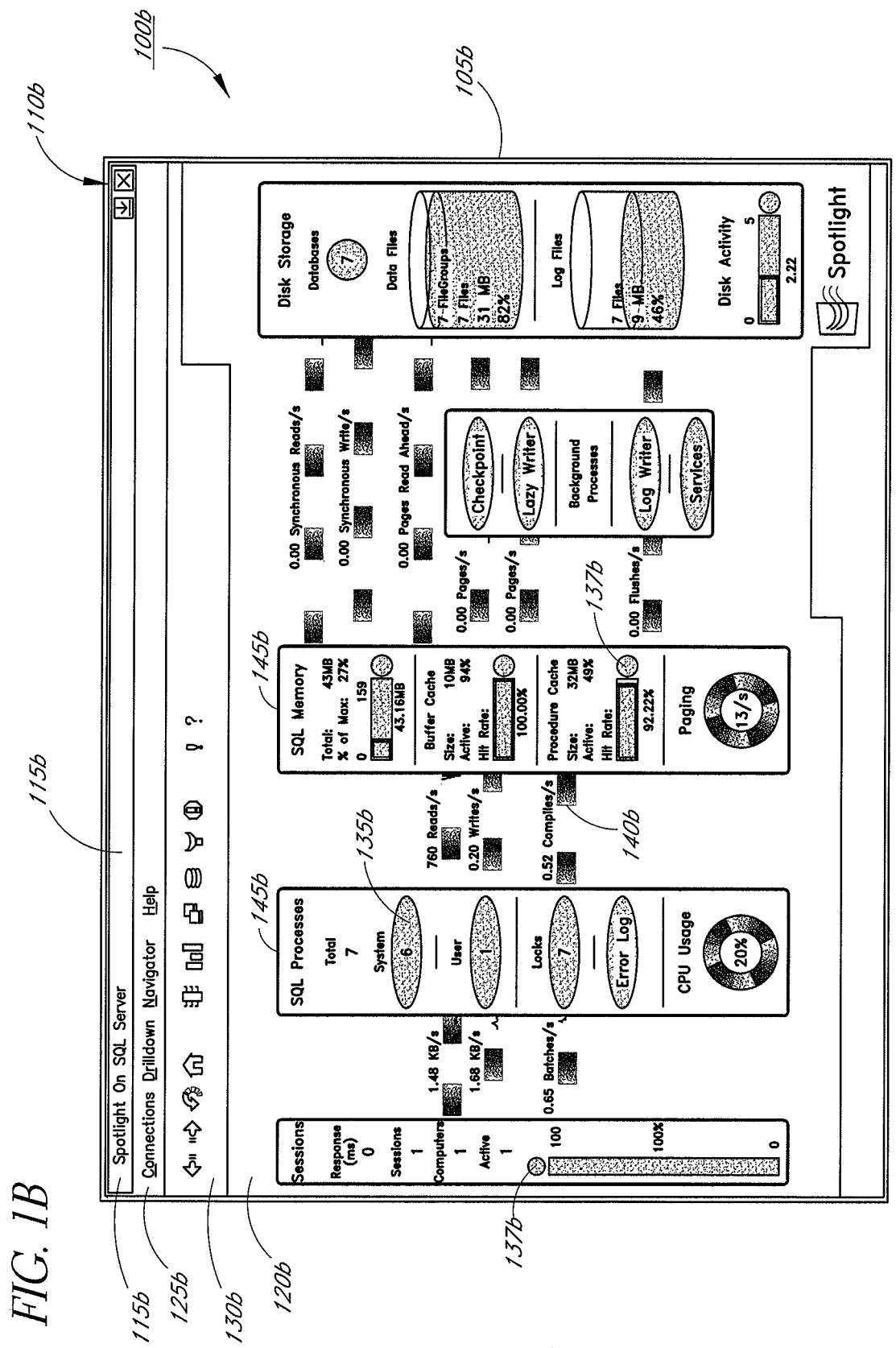
Figure 1C:
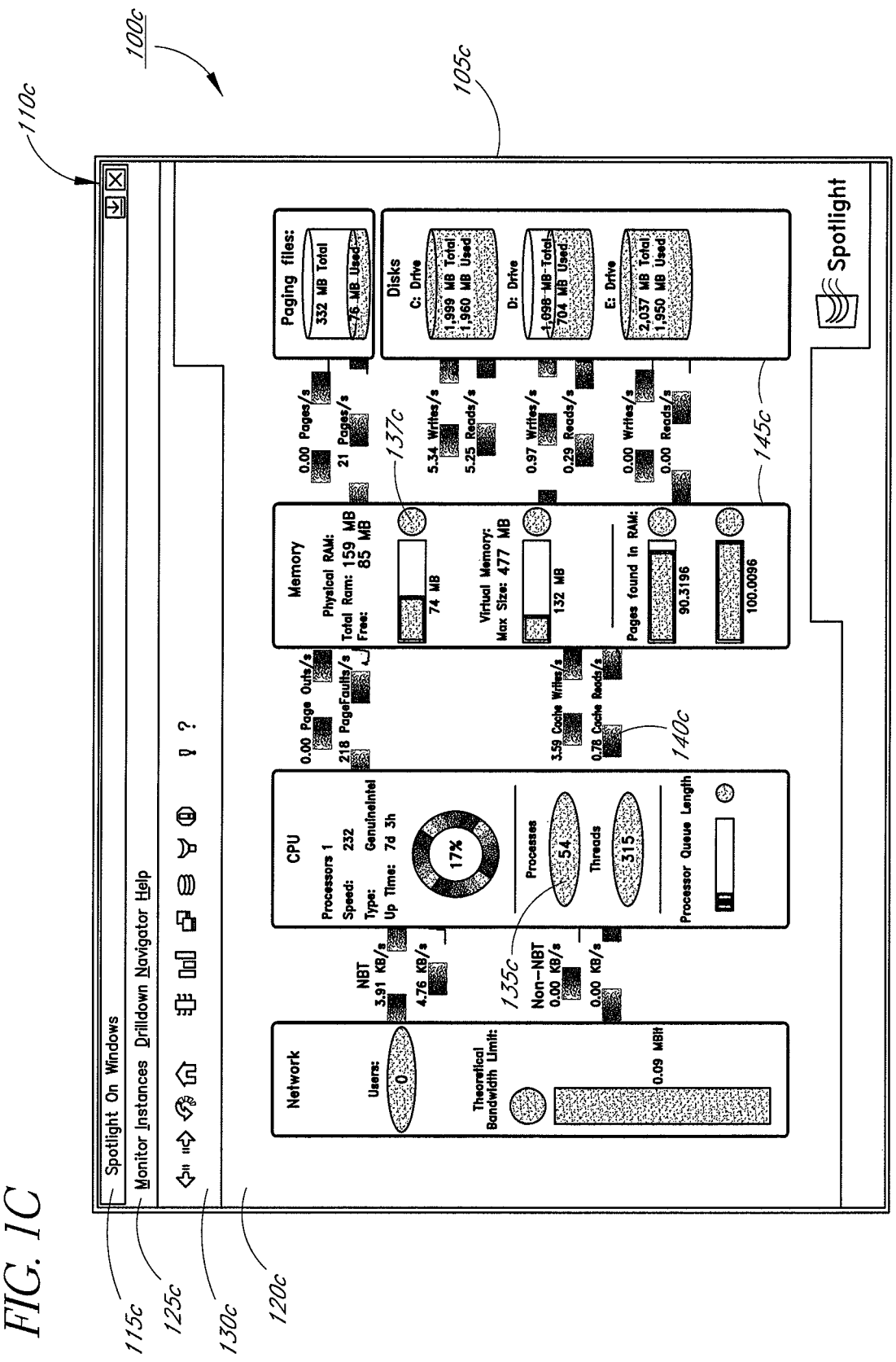

FIG. 1B illustrates a GUI 100*b* configured to display the performance of the application components of an SQL Server, such as, for example, those commercially available from Sybase or Microsoft. FIG. 1C illustrates a GUI 100*c* configured to display the performance of the application components of a network server, such as, for example, Windows NT, or the like. According to one embodiment, the monitoring system may execute on the network server as an additional set of server processes. According to another embodiment, the monitoring system and GUI 100*c* may execute on other systems, such as, for example, a client system, and may access and monitor the network server through the network.

Figure 1D:
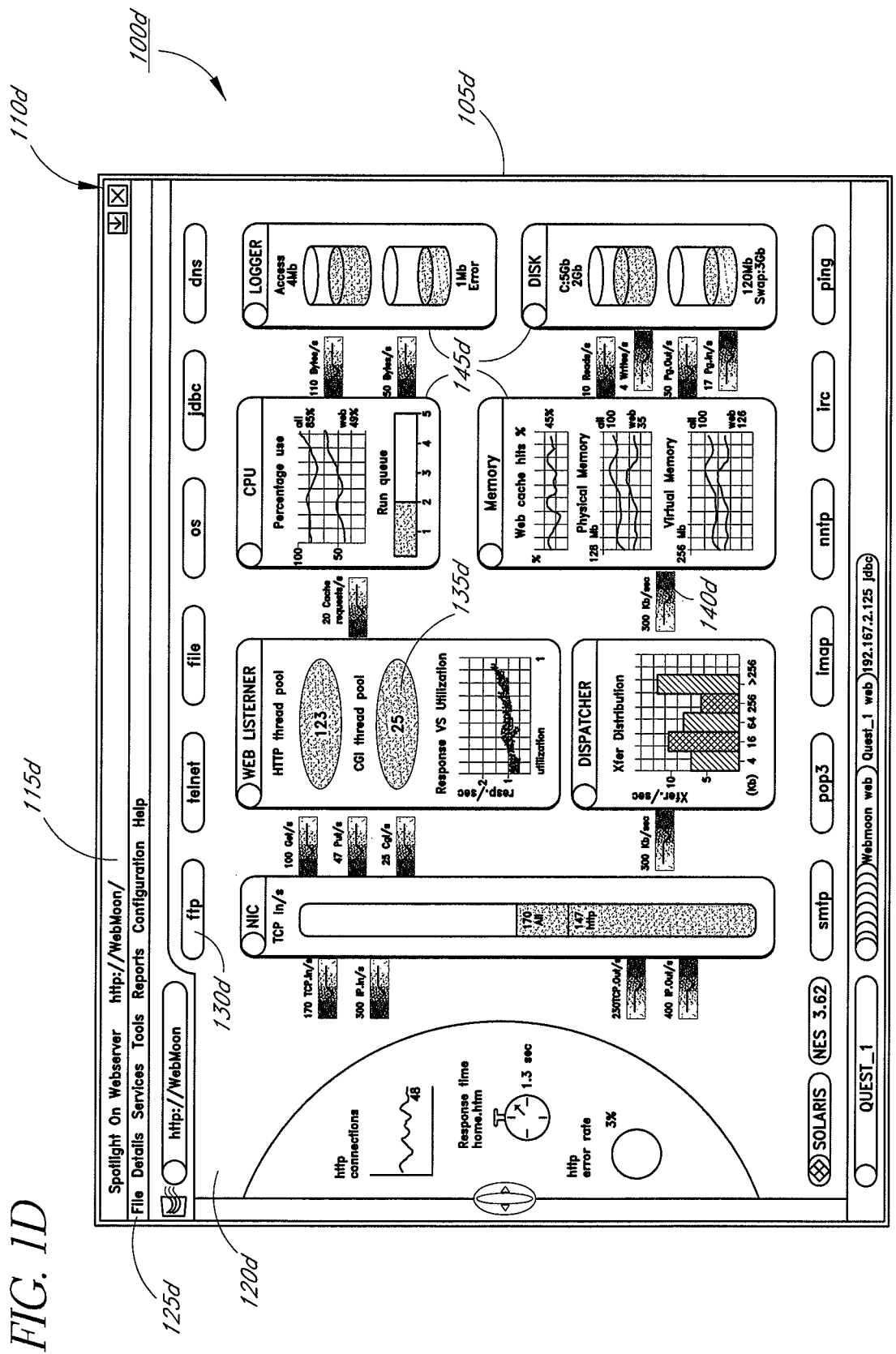
Figure 1E:
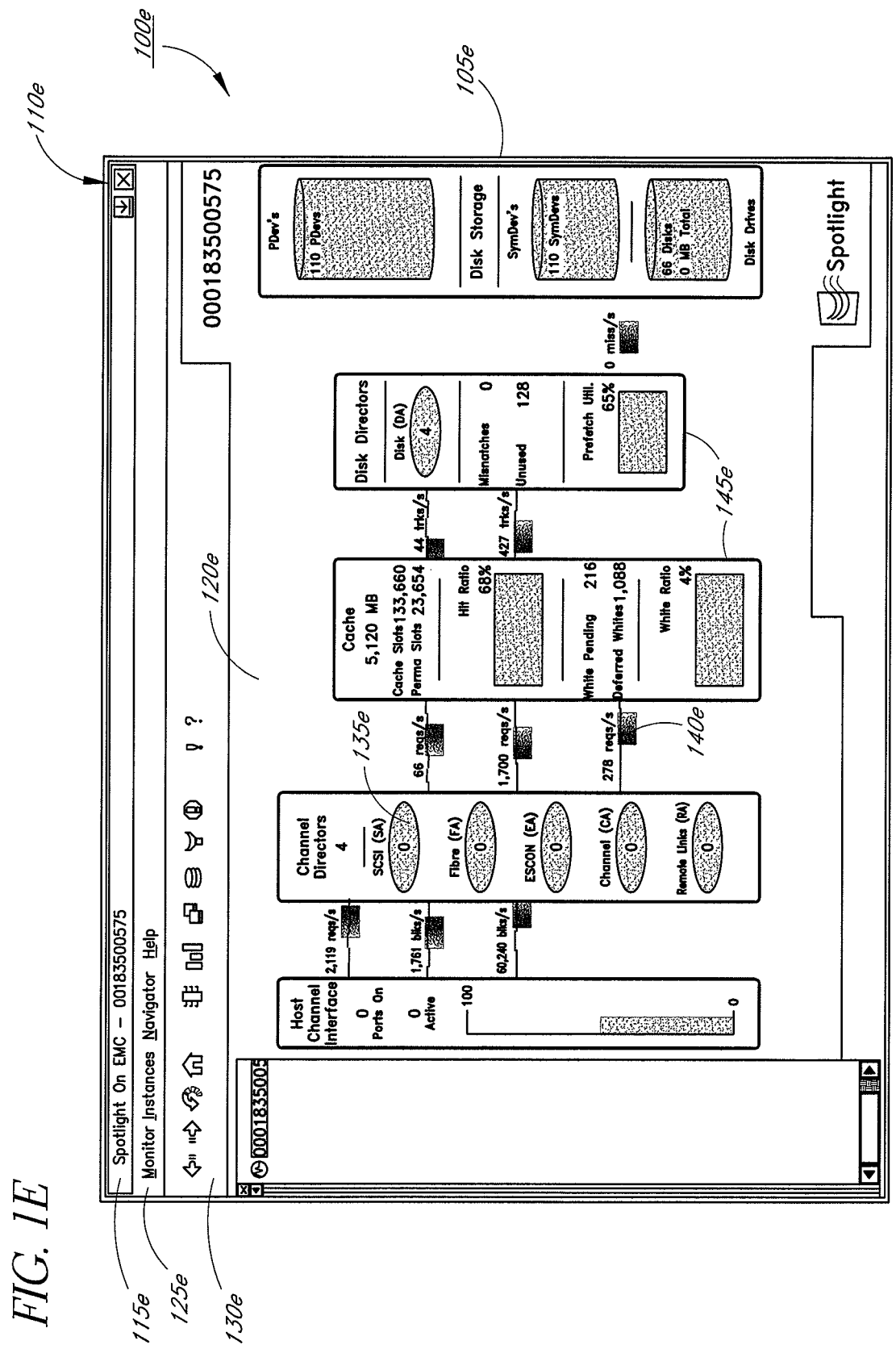

FIG. 1D illustrates a GUI 100*d* configured to display the performance of the application components of one or more system servers, such as, for example, a Web server, a mail server, and exchange server, a database server, an application server, a news server, a directory server, or combinations thereof. The foregoing system servers are often commercially available from, for example, Netscape, Microsoft, Apache, Novell, or the like. FIG. 1E illustrates a GUI 100*e* configured to display the performance of the application components of a one or more input/output devices. According to one embodiment of the invention, the input/output devices may include computer accessible storage mediums, such as, for example, disk drives and other mass storage systems. According to another embodiment of the invention, the input/output devices may include data storage arrays or enterprise storage networks, such as, for example, those commercially available from EMC Corporation. The data storage arrays often store gigabytes or terabytes of information and often include numerous systems and subsystems. The systems and subsystems may employ their own operating systems, controllers, hardware or software architectures, system interfacing components, or the like. As shown in FIG. 1E, the GUI 100*e* is configured to display the performance of the input/output device having various host channel interfaces, directors, caching, disk directors, disk drives, and the like.

Although the GUI 100 is disclosed with reference to several exemplary embodiments, the invention is not intended to be limited thereby. Rather, a skilled artisan will recognize from the disclosure herein a wide number of alternatives for the GUI 100. For example, the GUI 100 may be advantageously configured to display the performance of a vast number of computer systems or computer system flows. For example, the GUI 100 may monitor operating systems, utility programs, Internet or Intranet servers, mail or other exchanges, web services and servers, I/O systems, application servers, disk devices, or the like. Examples of the foregoing include DB/2, Microsoft Access, Window Operating System, Microsoft Exchange, or the like.

According to one embodiment, the GUI 100 includes an on-screen symbol, such as a pointer, allowing the user to select objects, perform commands, display pull-down menus, and the like. Moreover, the GUI 100 includes at least one interactive window 105. The interactive window 105 comprises a defined screen area where the monitoring system displays, updates, and refreshes various on-screen graphics, the pointer, and typically a wide variety of other interactive data.

The interactive window 105 includes resize controls 110, a title bar 115, a visual map 120, a menu bar 125, and a tool bar 130. The resize controls 110 provide conventional window resizing functions. For example, the resize controls 110 advantageously minimize, maximize, and return the interactive window 105 to its last, or default, non-maximized shape. A skilled artisan will recognize other conventional window resizing functions that may advantageously be incorporated into the resize controls 110. For example, the resize controls 110 may also include the ability to increase the height or width of the interactive window 105.

According to one embodiment, the title bar 115 indicates the type of application being monitored. For example, as shown in FIG. 1A, the title bar 115*a* indicates the monitoring system monitors a database management system (DBMS). According to the another embodiment, the DBMS comprises an Oracle instance governed by Oracle 7.3.3 or higher.

As mentioned in the foregoing, the interactive window 105 includes the visual map 120. The visual map 120 comprises a snapshot high-level overview of on-screen graphics representing major application components and groups of application components of the application being monitored. The visual map 120 advantageously groups performance data such that the visual map 120 provides enough detail for the administrator to quickly and efficiently identify and locate potential or actual problem areas in the application configuration. According to one embodiment, the on-screen graphics include icons 135 and status indicators 137 (discussed in further detail with reference to FIGS. 4A-4J), dataflows 140 (discussed in further detail with reference to FIG. 4K), panels 145 (discussed in further detail with reference to FIG. 4L), and a wide number of varying graphs, charts, statistical plots, and explanatory text.

According to the embodiment where the application being monitored is an Oracle Instance, such as, for example, the visual map 120*a* of FIG. 1A, the visual map 120*a* includes the following panels: an SQL*Net panel 150, a server processes panel 155, a system global area (SGA) panel 160, a background processes panel 165, and a disk devices panel 170. The visual map 120 also includes multiple dataflows 140 representing the rate of data transfer between the various application components represented in the panels 145. Exemplary dataflows 140*a* and panels 145*a* corresponding to the visual map 120*a* are discussed in further detail with reference to FIGS. 5A-5E.

Although the visual map 120 is disclosed with reference to several embodiments, the invention is not intended to be limited thereby. Rather, a skilled artisan will recognize from the disclosure herein a wide number of alternatives for the visual map 120. For example, the visual map 120 may advantageously incorporate a wide number of combinations of the icons 135, the dataflows 140, the panels 145, and varying graphics, charts, statistical plots and exemplary text, to represent a wide number of differing application components and data transfer rates for a wide number of differing applications. For example, as discussed in the foregoing, FIG. 1D illustrates the visual map 120*d* representing the application architecture of a Web server, including the Hypertext Transfer Protocol (HTTP) data flowing through the system and to and from the Internet.

The interactive window 105 also includes the menu bar 125. According to one embodiment, the menu bar 125 includes various pull down command menus activated by the pointing or other user input device. The command menus provide the administrator the ability to enter commands, perform monitoring and optimization tasks, calibrate the monitoring system, formulate and print reports, and the like. According to an embodiment, the menu bar 125 includes pull-down command menus grouped by the terms "Monitor" or "Connections," "Database" or "Instances" or "Collections," "Navigator" or "Drilldowns," "Help," and the like. The Monitor grouping provides the user the ability to connect and disconnect to the application being monitored and to refresh the visual map 120, including the on-screen graphics. According to one embodiment, refresh provides the administrator the option of manually rerunning, for example, queries on the performance data provided by the application.

The Monitor grouping also provides the commands to pause the visual map 120. For example, queries run against the performance data may advantageously be discontinued for a predetermined amount of time, thereby ceasing any overhead caused by the monitoring system. According to one embodiment, once the monitoring system is restarted, the visual map 120 may advantageously interpolate the nonacquired performance data points from the foregoing discontinuance. For example, the visual may 120 may average from the last data point before the discontinuance to the first data point taken thereafter. A skilled artisan will recognize a numerous mathematical operations for filling in the foregoing nonacquired data points.

In addition to the foregoing, the Monitoring grouping provides commands for exiting the monitoring system, and for printing, for example, a schematic representation of the visual map 120, one or more drilldowns, or the like. According to one embodiment the printout may be graphically altered to indicate the on-screen graphics of the particular visual map 120 in black and white.

The Monitoring grouping also provides commands for performing various calibrations and customizations. According to one embodiment, calibration provides default severities and thresholds for the performance statistics of a particular application executing on a particular computer system. For example, according to one embodiment, the monitoring system may monitor the application during a period the system administrator deems as normal usage. At this point, the monitoring system may update default severities and thresholds with the performance statistics gathered during the monitoring of normal usage. The update may advantageously include substituting, averaging, or other mathematical combinations of default severities and thresholds with those gathered during normal usage.

When the application being monitored includes a DBMS, the Database grouping advantageously lists the databases or instances that the monitoring system is connected to, and, according to one embodiment, allows the administrator to switch between viewing the visual map 120 associated with each.

The Navigator grouping provides access to drilldowns. Drilldowns include a number of administrator-selectable options that allow the administrator to obtain additional information on application components, their configurations, their performance statistics, recommendations, and the like. As mentioned in the foregoing, the visual map 120 comprises an overview of application components at a relatively high level. Drilldowns, on the other hand, provide a more detailed breakdown of the underlying performance statistics of the application components, thereby allowing the administrator to obtain increasing detail about the information represented in an on-screen graphic.

According an embodiment where the monitoring system is monitoring a DBMS, the drilldowns include "Top SQL," "Top Sessions," "Activity," "I/O," and "Alarm Log." The tool bar 130 also provides access to these drilldowns through shortcut icons. In addition, according to one embodiment, the user can access the foregoing drilldowns by using the pointer to select an area of the visual map 120. According to this embodiment, the monitoring system chooses the most appropriate drilldown related to the selected area.

The Top SQL drilldown provides a detailed review of characteristics of the parsed structural query language (SQL) statements from clients of the DBMS. SQL, and subsequent various versions thereof, comprise the standardized query language for requesting information from a database. According to one embodiment, the user sorts the SQL statements based on a characteristic and then reviews the performance statistics associated therewith. For example, the user may choose to sort SQL statements based on the number disk reads that each SQL statement used. This information advantageously allows the user the ability to determine the SQL statements that are using the most system resources such that those SQL statements can be targeted for tuning.

The Top Sessions drilldown provides a detailed review of all the clients of the DBMS. Generally, when an administrator is performance tuning the application, one or a handful of users, processes, or jobs, is consuming more that their share of system resources. The Top Sessions drilldown identifies the foregoing users, processes, or jobs, determines the cause(s) of the inappropriate resource consumption, and optionally terminates those users, processes, or jobs.

The Activity drilldown provides a summary review of the application performance similar to that of the interactive window 105, however, the Activity drilldown provides the summary in a more traditional format, such as, for example, tables of data or the like.

The I/O drilldown provides a detailed review of the input/output (I/O) across multiple devices and identifies I/O hotspots, such as, for example, bottlenecks, poor data flow, or resource consumption.

The menu bar 125 also includes the Help grouping. The Help grouping provides conventional help commands, such as context sensitive information based on the type of data currently displayed in the interactive window 105. Moreover, the conventional help commands include topical and term-indexed user manuals, access to online help, CD-ROM or other interactive media or animation, default settings restoration, information about the particular version and supplier of the monitoring system.

Although the title bar 115, menu bar 125 and tool bar 130 are disclosed with reference to their respective embodiments, the invention is not intended to be limited thereby. Rather, a skilled artisan will recognize from the disclosure herein a wide number of alternatives for foregoing interactive command menus.

Figure 2:
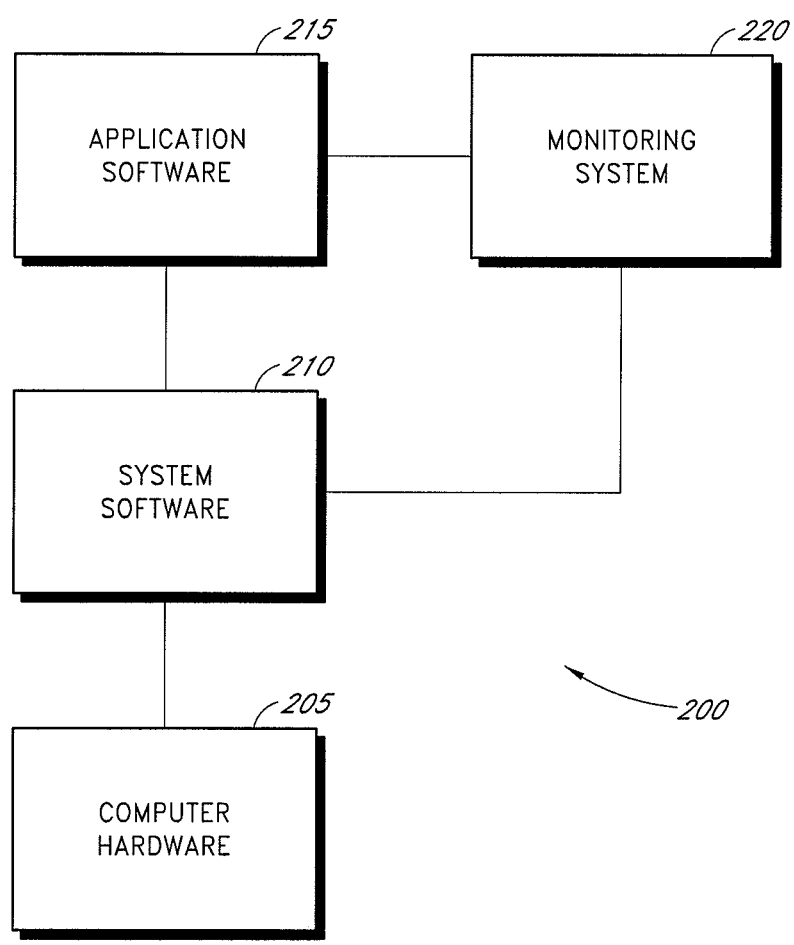
FIG. 2 illustrates a relational diagram between various computer system components, according to aspects of an embodiment of the invention.

FIG. 2 illustrates a relational diagram 200 showing various relationships between aspects of a computer system, according to aspects of one embodiment of the invention. For example, FIG. 2 illustrates computer hardware 205, system software 210, application software 215, and a monitoring system 220. As shown in FIG. 2, the figurative foundational technology resides at the computer hardware 205. According to one embodiment, the computer hardware 205 includes components such as a computer having a monitor, memory, mass storage, and a user input device. The computer hardware 205 may be provided from a number of computer system manufactures, such as Intel, HP, Compaq, IBM, Sun, Apple, Palm, Casio, or the like. In addition, the computer hardware 205 may include those components typically found in modern PCs, workstations, mainframes, laptops, personal computing devices, personal digital assistants, or other computer systems.

FIG. 2 also shows the system software 210 comprising low-level computer programs interacting with the components of the computer hardware 205. The system software 210 may advantageously include an operating system adapted to interact with components of the computer hardware 205. For example, the operating system may comprise a graphical or windows-based operating system, such as, for example, Unix, Linux, Windows, Apple OS, or the like. The system software 210 may also include such programs as compilers, file management tools, or software utilities.

Also as illustrated in FIG. 2, the application software 215 figuratively rests on top of the system software 210. For example, the application software 215 generally makes system calls to the system software 210 in order to interact with the components of the computer hardware 205, rather than recreate its own the low-level software. The application software 215 generally includes software designed for end users, such as word processors, spreadsheets, Internet browsers and the like. According to one embodiment of the invention, the application software 215 includes at least one DBMS.

FIG. 2 also illustrates the relation diagram 200 including the monitoring system 220 according to aspects of an embodiment of the invention. As shown in FIG. 2, the monitoring system 220 may also figuratively rest on top of the system software 210, and may access the system software 210 to make system calls and interact with components of the computer hardware 205. As mentioned above, according to one embodiment of the invention, the monitoring system may access the application software 215 to obtain performance statistics relating to the performance of the application software 215.

Although the foregoing relational diagram 200 has been described in terms of certain embodiments, other embodiments will be apparent to those of ordinary skill in the art from the disclosure herein. For example, the monitoring system 220 may monitor the system software 210 or a combination of the system software 210 and the application software 215. In addition, the computer hardware 205 may comprise a wide number of commercially available computer systems. Moreover, the system software 210 may advantageously include a wide number of low-level programs designed to interact with the wide number of computer systems. In addition, the application software 215 may advantageously provide certain software modules designed to interact directly with the computer hardware 205. Also, the monitoring system 220 may reside and/or execute on resources of a network similar to, or entirely separate from, those of the application software 215.

Figure 3:
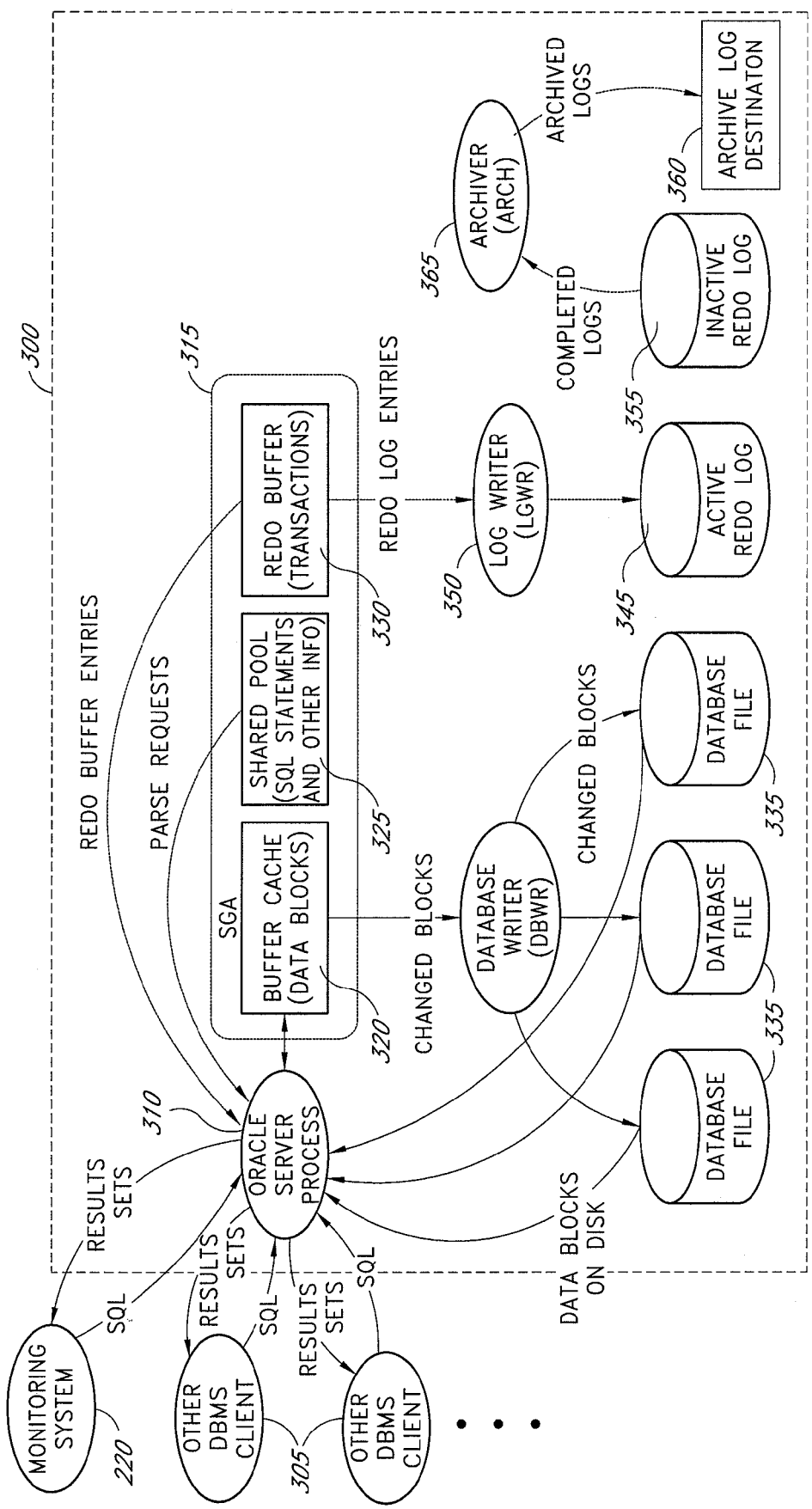
FIG. 3 illustrates a block diagram of a database management system (DBMS) represented in the monitoring system GUI of FIG. 1.

FIG. 3 illustrates a block diagram of an embodiment of the application software 215 where the application software 215 includes a DBMS 300. As shown in FIG. 3, the DBMS 300 includes DBMS clients 305, such as software programs typically found in the application software 215. The DBMS clients 305 interact with a server process 310. According to one embodiment, the DBMS clients 305 include the monitoring system 220. The server process 310 conducts SQL processing, such as parsing and server assignment, on behalf of the DBMS clients 305. The server process 310 parses SQL statements, such as SELECT, UPDATE, and the like.

The DBMS 300 also includes a system global area (SGA) 315. The SGA 315 comprises an area of shared memory where the DBMS 300 stores information shared by multiple DBMS clients 305. The SGA 315 includes a buffer cache 320, a shared pool 325, and a redo buffer 330. The buffer cache 320 contains copies of frequently or recently accessed data in memory, thereby reducing disk input/output. The shared pool 325 contains recently parsed SQL statements from the DBMS clients 305. Thus, according to an embodiment, when the server process 310 receives an SQL statement from one of the DBMS clients 305, the server process 310 may access the shared pool 325 to determine whether the SQL statement was recently or frequently parsed, thereby reducing parsing overhead. The redo buffer 330 contains a copy of DBMS transactions, or redo log entries, that may not yet been written to disk. These redo log entries provide for data recovery in the case of system or database failure.

The DBMS 300 also includes one or more database files 335 containing the data of the DBMS 300. The database files 335 may logically be segmented into tables and indexes. A process, called the database writer (DBWR) process 340, writes changed blocks from the buffer cache 320 to the database files 335, thereby maintaining accurate data in the database files 335. The DBMS 300 also includes an active redo log 345 containing the redo log entries of the DBMS 300. A process, called the log writer (LGWR) process 350, writes the data of the redo buffer 330 to the active redo log 345, thereby maintaining a record of the transactions of the DBMS 300.

According to one embodiment, the DBMS 300 includes multiple redo logs. For example, while the DBMS 300 is accessing the active redo log 345, an inactive redo log 355 may advantageously include transaction data from previous activity of the DBMS 300. That transaction data may be archived in an archive log destination 360 by an ARCHIVER process 365. The archiving is accomplished by conventional means and is adapted to reduce the storage size of the data through conventional compression techniques. Once the inactive redo log 345 has been archived, the DBMS may switch the active redo log 345 with the inactive redo log 355 as the active redo log 345 becomes full, thereby advantageously using the memory available in the inactive redo log 355. In such case, the active redo log 345 becomes the inactive redo log 355.

Based on the above, the dataflow through the DBMS 300 is as follows. One of the DBMS clients 305 may issue an SQL statement to the server process 310. The server process 310 checks the shared pool 325 to see if the SQL statement has already been parsed. If not, the server process 310 parses the SQL statement and stores it in the shared pool 325. The server process 310 then accesses the buffer cache 320 to determine whether the requested data has recently or frequently been used. If not, the server process 310 fetches the requested data from the database files 335, and may advantageously update the data in the buffer cache 320. The server process 310 then forwards the requested data back to the DBMS client 305.

On the other hand, when the DBMS client 305 issues an SQL statement requesting to change data stored in the shared pool 325, the server process 310 performs the foregoing fetch of the requested data. The server process 310 then performs the change on the data stored in the buffer cache 320 and may advantageously enter a record of the transaction in the redo buffer 330. The DBWR process 340 then writes the changed data to the database files 335 while the LGWR process 350 writes the transaction data to the active redo log 345.

According to an embodiment, the monitoring system 220 periodically issues an SQL statement requesting data from the DBMS 300 representing performance statistics of the DBMS 300, stored in the database files 335. Similar to the foregoing data request, the server process 310 accesses the data either through the buffer cache 320 of the database files 335. The server process 310 then returns the performance statistics to the monitoring system 220.

Although the DBMS 300 has been described in terms of various embodiments, a skilled artisan will recognize from the disclosure herein a wide number of alternative data flows and application components for the DBMS 300. For example, the background processes, DBWR 340 or LGWR 350 may advantageously pause and perform their respective functions at a later time. Moreover, the skilled artisan will recognize from the disclosure herein a wide number of alternative data flows and application components for each of the foregoing applications monitored by the monitoring system 220, such as, for example, the operating systems, utility programs, Internet or Intranet servers, mail or other exchanges, web services and servers, I/O systems, application servers, disk devices, or the like.

Figure 4A:
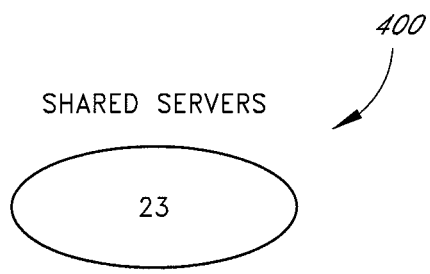
FIGS. 4A-4J illustrate exemplary icons, according to an embodiment of the invention.

FIGS. 4A-4L illustrate on-screen graphics of the monitoring system 220. As mentioned in the foregoing, these on-screen graphics provide visual feedback to the user monitoring the monitoring system 220 in order to ensure the performance of the application being monitored. In particular, FIGS. 4A-4J illustrate exemplary icons, according to an embodiment of the invention. In that regard, FIG. 4A illustrates a process icon 400 according to an embodiment of the invention. The process icon 400 includes attributes that convey performance information related to processes of the application. These attributes include, for example, a shape, a label, a value and a color. The shape readily indicates to the user that the application component being graphically represented in the interactive window 105 is that of a process. According to another embodiment, the shape of the process icon 400 comprises an oval. The process icon 400 also includes a label. The label and readily indicates to the user a textual description of the type of process that the process icon 400 represents. The value readily indicates to the user the state, existence, or number of processes in the application that are currently active or otherwise in use and that are grouped so as to correspond to this particular type of process. In addition, the color of the process icon 400 indicates a caution level. For example, according to an embodiment of the invention, the color green corresponds to a low caution level, thereby indicating to the user that the number of processes represented by the process icon 400 are within an acceptable range. Moreover, the colors yellow and red correspond to increasingly higher caution levels indicating an increasing likelihood of a bottleneck or other application performance impediment.

Although the process icon 400 of FIG. 4A is disclosed with reference to an embodiment, the invention is not intended to be limited thereby. Rather, a skilled artisan will recognize from the disclosure herein a wide number of alternative representations. For example, the shape may advantageously include a wide number of conventional geographic shapes. In addition, the process icon 400 may include a wide number of incremental color changes corresponding to a wide number of increasingly higher caution levels. Moreover, the value may be removed and the user views only the color-coded caution levels. Moreover, the attributes assigned to particular on-screen graphic may advantageously be changed. For example, a texture, as opposed to or in conjunction with, the color may indicate caution levels. Moreover, a range of caution levels may be incorporated into the text of the process icon 400 as an indication of the caution spectrum.

Figure 4B:
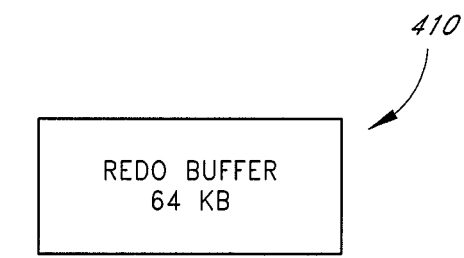

FIG. 4B illustrates a memory icon 410 according to an embodiment of the invention. The memory icon 410 includes attributes that convey performance information related to the utilization of database-specific memory structures or areas of memory used by the application. These attributes include, for example, a shape, a label, a value and a color. The shape indicates to the user that the application component being graphically represented in the interactive window 105 is that of a memory structure. According to one embodiment, the shape of the memory icon 410 comprises a rectangle. The memory icon 410 also includes a label. The label indicates to the user a textual description of the type of memory structure that the memory icon 410 represents. The value readily indicates to the user the size of the particular memory structure. In addition, the color of the memory icon 410 indicates the foregoing caution levels. For example, according to an embodiment, the colors green through red correspond to increasingly higher caution levels indicating an increasing likelihood of a bottleneck or other application performance impediment.

Figure 4C:
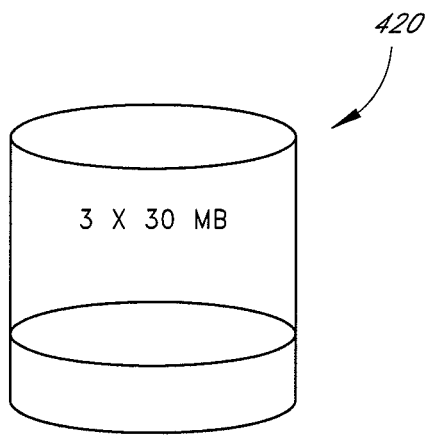

FIG. 4C illustrates a disk icon 420 according to an embodiment of the invention. The disk icon 420 includes attributes that convey performance information related to memory structures representing disk storage, regardless of the actual location of the data. For example, the disk storage may include mass storage, such as one or more physical disks, or memory, such as conventional electronic memory available for use by the application. These attributes include, for example, a shape, a label, a value, a fill, and a color. The shape readily indicates to the user that the application component being represented in the interactive window 105 is that of a disk structure. According to an embodiment, the shape of the disk icon 420 comprises a three-dimensional cylinder. The disk icon 420 also includes a label. The label readily indicates to the user a textual description of the type of data stored in the particular disk structure that the memory icon 410 represents. According to an embodiment of the invention, the value may advantageously and readily indicate a number of attributes of the particular disk structure. For example, the value may include a capacity size, thereby indicating the available capacity of the disk structure. The value may also include the amount of space used, or the amount of space currently available for use. Moreover, the foregoing values may be actual sizes, or percentages of the total available space. In addition, the value may include a partitioning of the types of data. For example, in the one embodiment, the monitoring system that monitors the DBMS 300, the disk icon 420 may include the number of tables, indexes, or the like. In addition, the fill may correspond to any, or a combination, of the above values. For example, the disk icon 420 may fill the cylinder corresponding to the percentage of available space already used.

The color of the disk icon 420 indicates the foregoing caution levels. For example, according to one embodiment, the colors green through red correspond to increasingly higher caution levels indicating an increasing likelihood of a bottleneck or other application performance impediment. Moreover, the dynamic color scheme may be advantageously confined to the space "filled" in the disk icon 420 while the remaining portions of the disk icon 420 use a static color, such as, for example, a transparent color for the unfilled portions of the cylindrical disk.

Figure 4D:
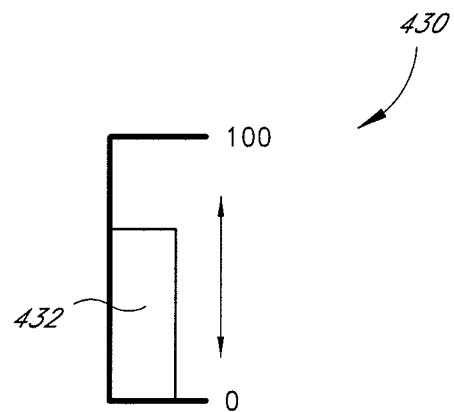
Figure 4E:
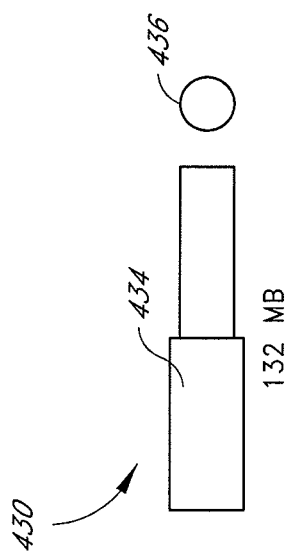
Figure 4F:
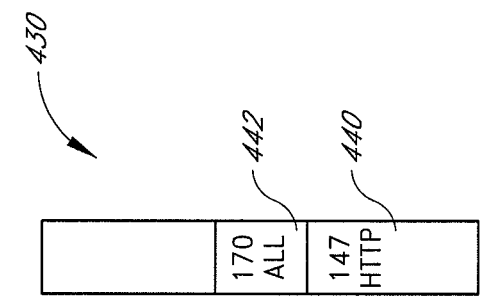

FIGS. 4D through 4F illustrate various types of meter icons 430 according to an embodiment of the invention. The meter icons 430 include attributes that convey measurement information related to the application components representing, for example, finite resources.

The attributes represented by the meter icons 430 include, for example, a shape, a label, and a color. The shape comprises that of an increasing graphic such as a bar or a pie chart.

The increasing graphic indicates a number or percentage of the component being represented. The meter icon 430 also includes a label. The label readily indicates to the user a textual description of the range of values available to the meter icon 430. For example, the meter icon 430 may indicate a percentage and may advantageously include labels indicating zero and one hundred percent. The dynamic graphic increases or "grows" from the minimum value to the maximum value to reflect the underlying performance data of the application. The color of the meter icon 430 indicates the foregoing caution levels. For example, according to an embodiment, the colors green through red correspond to increasingly higher caution levels indicating an increasing likelihood of a bottleneck or other application performance impediment.

As shown in FIG. 4D, the meter icon 430 may include a rising and falling bar 432 graphically illustrating, for example, the number of users logged onto a particular system. As shown in FIG. 4E, the meter icon 430 may alternatively include a horizontal bar 434 growing or shrinking right or left depending upon, for example, the percentage use of a finite system resource.

FIG. 4E also illustrates a status indicator 436 according to an embodiment of the invention. The status indicator 436 provides a graphical indication of the status of the performance of the application components represented by the meter icon 430. The status indicator 436 may advantageously turn green, yellow, and red corresponding to increasing severity in the performance of the application. Use of the status indicator allows the monitoring system to alert an administrator at multiple points along the meter icon 430. For example, the performance or availability of a system may be greatly damaged when a finite resource is used too much or too little. The status indicator 436 may advantageously activate when the value of the performance statistics approaches 0, 100%, or both.

Figure 4G:
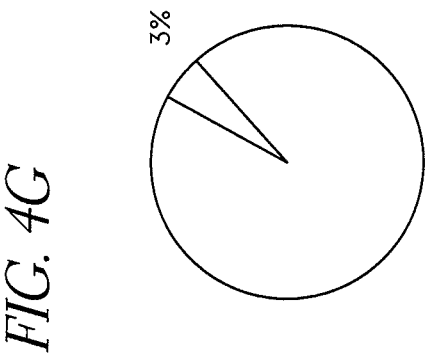

FIG. 4F illustrates another meter icon 430 including a moving vertical bar 438 reacting similar to the horizontal bar 434. FIG. 4G illustrates yet another meter icon 430 having stacked rising and falling bars 440 and 442, graphically indicating, for example, the total TCP/IP traffic through a Web server. As shown in FIG. 4G, the meter icon 420 also graphically illustrates various types of TCP/IP traffic through employment of multiple bars 440 and 442, each illustrating their respective share and type of TCP/IP traffic. For example, bar 440 indicates the amount of HTTP traffic, while bar 442 illustrates the total amount of TCP/IP traffic, including the foregoing HTTP traffic.

Figure 4H:
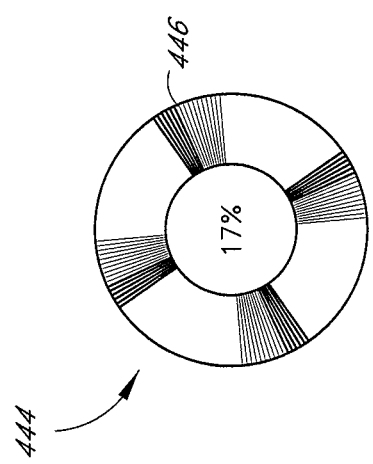
Figure 4I:
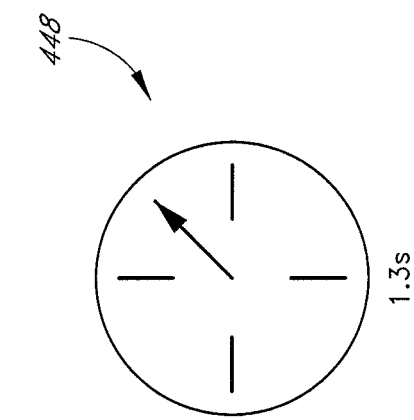

FIG. 4H illustrates a rotating icon 444 according to an embodiment of the invention. The rotating icon 444 graphically illustrates performance statistics with both a label and one or more rotating pulses 446. The speed, color, or both, of the pulses 446 advantageously accentuate increasing caution levels corresponding to the performance statistics being represented. FIG. 4I illustrates a timing icon 448 graphically illustrating, for example, performance statistics relating to a timed event. For example, the timing icon 448 may advantageously illustrate the response time for a particular instruction sent from one group of application components to arrive at another. A skilled artisan will recognize from the disclosure herein, a number of timed events or groups of timed events that may advantageously and efficiently be represented with the timing icon 448.

Figure 4J:
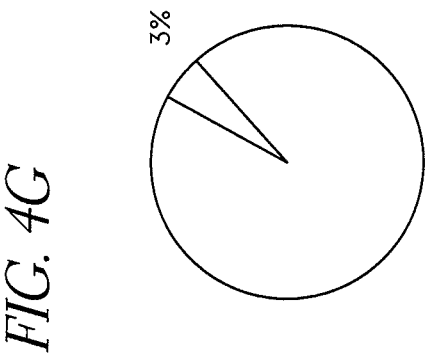

FIG. 4J illustrates one of a wide variety of graph and chart icons. As shown in FIG. 4J, the chart icon graphically illustrates a pie chart showing, for example, the percentage use of a finite resource. One of ordinary skill will recognize from the disclosure herein and the exemplary GUIs 100 of FIGS. 1A through 1E, that a large number of charts and graphs may advantageously and efficiently display historical performance data.

Although the memory icon 410, the disk icon 420, the meter icons 430, the rotating icon 444, the timer icon 448, and various chart and graph icons are disclosed with reference to specific embodiments, the invention is not intended to be limited thereby. Rather, a skilled artisan will recognize from the disclosure herein a wide number of alternative representations. For example, the shapes may advantageously include a wide number of conventional geographic shapes. In addition, the icons may include a wide number of incremental color changes corresponding to a wide number of increasingly higher caution levels, including blinking. Moreover, the value may be removed such that the user views only the color-coded caution levels. Moreover, the attributes assigned to particular characteristics of a particular application component may advantageously be changed. For example, a texture, as opposed to or in conjunction with, the color may indicate the caution levels. Moreover, a range of caution levels may be incorporated into the text of the foregoing on-screen graphics as an indication of the caution spectrum. Moreover, textual displays such as a digital stopwatch-like timing icon, may advantageously be incorporated into, or used in lieu of, the foregoing icons.

Figure 4K:
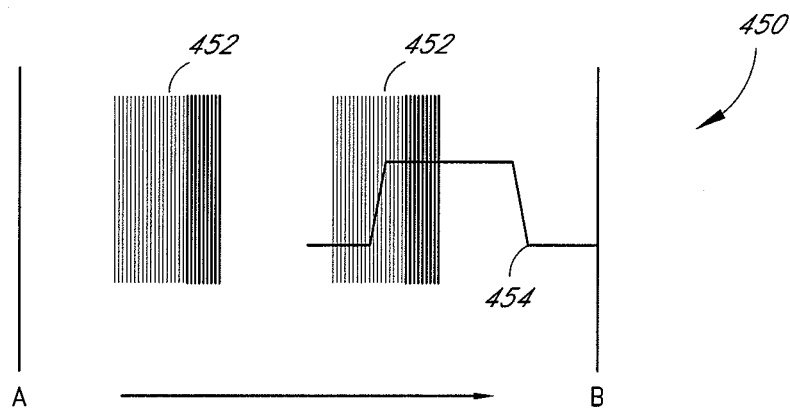
FIG. 4K illustrates an exemplary dataflow according to an embodiment of the invention.

FIG. 4K illustrates an exemplary dataflow 450 according to an embodiment of the invention. According to one embodiment, the dataflow 450 represents the rate, in seconds, of the various data flowing between application components. The dataflow 450 includes at least one flow 452, a graph 454. The flow 452 represents the current level, speed, and direction of data transfer. If the data transferring between one application component and another increases, then, the speed of the flow 452 increases as well. In addition, the color of the flow 452 may advantageously change corresponding to the rate of data transfer. For example, the color may correspond to increasing caution levels based on, for example, a falling rate of data transfer. The foregoing combination of speed and color advantageously allows the user to readily identify any congested areas long before bottlenecks, or system failure due to overload, occur.

The dataflow 450 may also advantageously include the graph 454. The graph 454 illustrates how the data transfer rate has varied over time. According to one embodiment, the graph 454 automatically calibrates its axes values to allow for a spike in the load. Alternatively, the graph 454 may advantageously clip portions of the graph exceeding the available values of the axes.

Figure 4L:
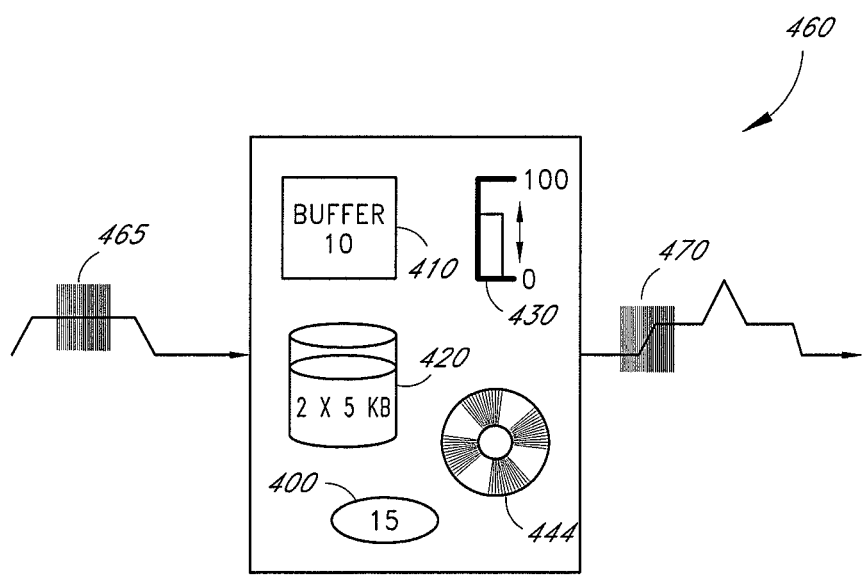
FIG. 4L illustrates an exemplary panel and associated dataflows, according to an embodiment of the invention.

FIG. 4L illustrates an exemplary panel 460 and associated dataflows, according to an embodiment of the invention. The panel 460 groups on-screen graphics representing related application components. As shown in FIG. 4E, the on-screen graphics may include the process icon 400, the memory icon 410, the disk icon, 420, and the meter icon 430. Moreover, the panel 460 includes incoming dataflows 465 and outgoing dataflows 470. The incoming dataflow 465 represents a data transfer rate from one or more applications components not represented in the panel 460, to one or more application components represented in the panel 460. Likewise, the outgoing dataflow 470 represents a data rate from one or more of the application components represented in the panel 460.

Figures 5A, 5B:
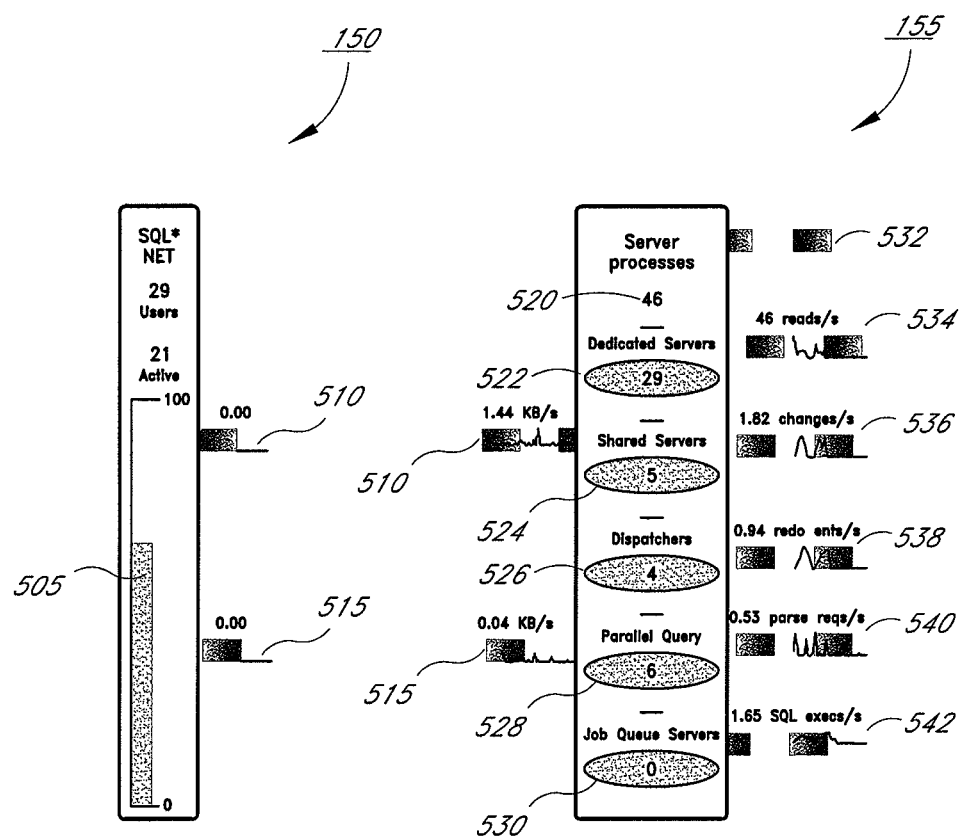
FIGS. 5A-5E illustrate the panels and their associated dataflows, according to the monitoring system GUI of FIG. 1.

FIGS. 5A-5E illustrate the panels 145 and their associated dataflows, according to the monitoring system GUI 100 of FIG. 1. For example, FIG. 5A illustrates the SQL*Net panel 150. As shown in FIG. 5A, the SQL*Net panel 150 shows the total number of users, or the total number of DBMS clients 305 shown in FIG. 3, currently connected to the DBMS 300. The SQL*Net panel 150 also shows the number of users currently active and employs a meter icon 505 to represent the active users as a percentage of all users. The meter icon 505 uses the foregoing color caution levels to indicate when the percentage of active users increases to the point of causing a system overload.

The SQL*Net panel 150 also includes a dataflow 510 representing the rate of data transferred from the server processes of the server processes panel 155 to the DBMS clients 305. The SQL*Net panel 150 also includes a dataflow 515 representing the rate of data transferred to the server processes of the server processes panel 155 from the DBMS clients 305.

FIG. 5B illustrates the server processes panel 155. The server processes panel 155 represents the status of the server processes 310 with process icons. As shown in FIG. 5B, the server processes panel 155 includes the number of server processes currently active 520, the number of dedicated servers 522, the number of shared servers 524, the number of shared server dispatchers 526, the number of parallel query servers 528, and the number of job queue servers 530. According to an embodiment, the dedicated servers 522 include those server processes that perform work for a single DBMS client 305. Moreover, the shared servers 524 include those server processes that perform work for multiple DBMS clients 305. The process icon for shared servers 524 uses the foregoing color caution levels to indicate when a disproportionate number of the shared servers 524 become busy. The shared server dispatchers 526 represent the server processes that allocate the shared servers 524 to client tasks. The process icon for the dispatchers 526 uses the foregoing color caution levels to indicate when a disproportionate number of the dispatchers 526 become busy. The parallel query servers 528 represent those server processes supporting parallel execution of queries. The process icon for the parallel query servers 528 uses the foregoing color caution levels to indicate when a disproportionate number of the parallel query servers 528 become busy. The job queue servers 530 represent those server processes responsible for running commands submitted to the DBMS job queue. The process icon for the job queue servers 530 uses the foregoing color caution levels to indicate when a disproportionate number of the job queue servers 530 become busy.

The server processes panel 155 also includes the dataflows 510 and 515. Moreover, the server processes panel 155 includes a dataflow 532 representing the rate the foregoing server processes read blocks from the database files 335 of the disk devices panel 170. The dataflow 532 employs the foregoing color caution levels and speed to indicate when the average time to respond to the reads increases above one or more thresholds. In addition, the server processes panel 155 includes a dataflow 534 representing the rate the server processes of the server processes panel 155 read blocks from the memory structures of the SGA panel 160. The server processes panel 155 also includes a dataflow 536 representing the rate the server processes of the server processes panel 155 changes to blocks in the memory structures 320, 325, and 330, of the SGA panel 160. The dataflow 536 employs the foregoing color caution levels and speed to indicate when locks on the memory structures 320, 325, and 330 block any changes thereto.

The server processes panel 155 also includes a dataflow 538 representing the rate the server processes of the server processes panel 155 store redo buffer entries into the redo buffer 330. In addition, the server processes panel 155 includes a dataflow 540 representing the rate of SQL parse requests by the server processes. The dataflow 540 employs the foregoing color caution levels and speed to indicate when a ratio of parse requests to execute requests increases above one or more thresholds. Moreover, the server processes panel 155 includes a dataflow 542 representing the rate of SQL execution requests by the server processes of the server processes panel 155.

Figure 5C:
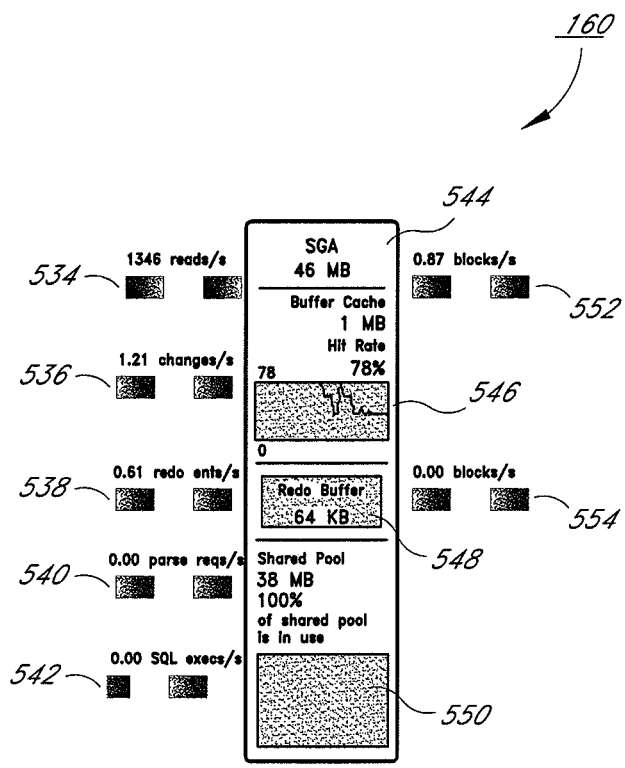

FIG. 5C illustrates the SGA panel 160. The SGA panel 160 represents an area of shared or common process memory used to cache data, SQL statements, procedures, and the like. According to an embodiment, the SGA panel 160 includes data representing characteristics of the buffer cache 320, the shared pool 325, and the redo buffer 330. As shown in FIG. 5C, the SGA panel 160 includes a total size indication 544 of the memory available to the SGA, a buffer cache section 546, a memory icon 548 representing the redo buffer 330, and a shared pool section 550. The buffer cache section 546 includes a buffer cache size, a buffer cache hit rate, and a graph showing recent values of the cache hit rate. The buffer cache section 546 may include a number of visual indicators of caution implemented with the foregoing color caution levels, including, the number of buffer cache misses, the amount of time the buffer is busy, and the least recently used chain latch. For example, generally a latch is an internal lock that protects memory from concurrent updates. When users spend inappropriate amounts of time waiting for latches, the monitoring system 220 will highlight the relevant memory areas. In the case of the buffer cache, the latches may be called "cache buffer chains" and "cache buffer LRU chains"

The SGA panel 160 also includes the memory icon 548 representing the redo buffer 330. According to an embodiment, the memory icon 548 includes the color caution levels when the server processes increasingly wait for space in the redo buffer 330 or when the LGWR process 350 locks the redo buffer 330 during data movement to the active redo log 345. Also, the shared pool section 550 includes various in-memory items that are shared across multiple processes, such as, for example, shared SQL statements and some session information. In addition, the share pool section 550 employs the color caution levels when there is a low hit rate on the cached SQL statements.

The SGA panel 160 also includes a dataflow 552 representing the rate the DBWR process 340 writes blocks to the database files 335. In addition, the SGA panel 160 also includes a dataflow 554 representing the rate the LGWR process 350 writes redo log blocks to the database files 335.

Figures 5D, 5E:
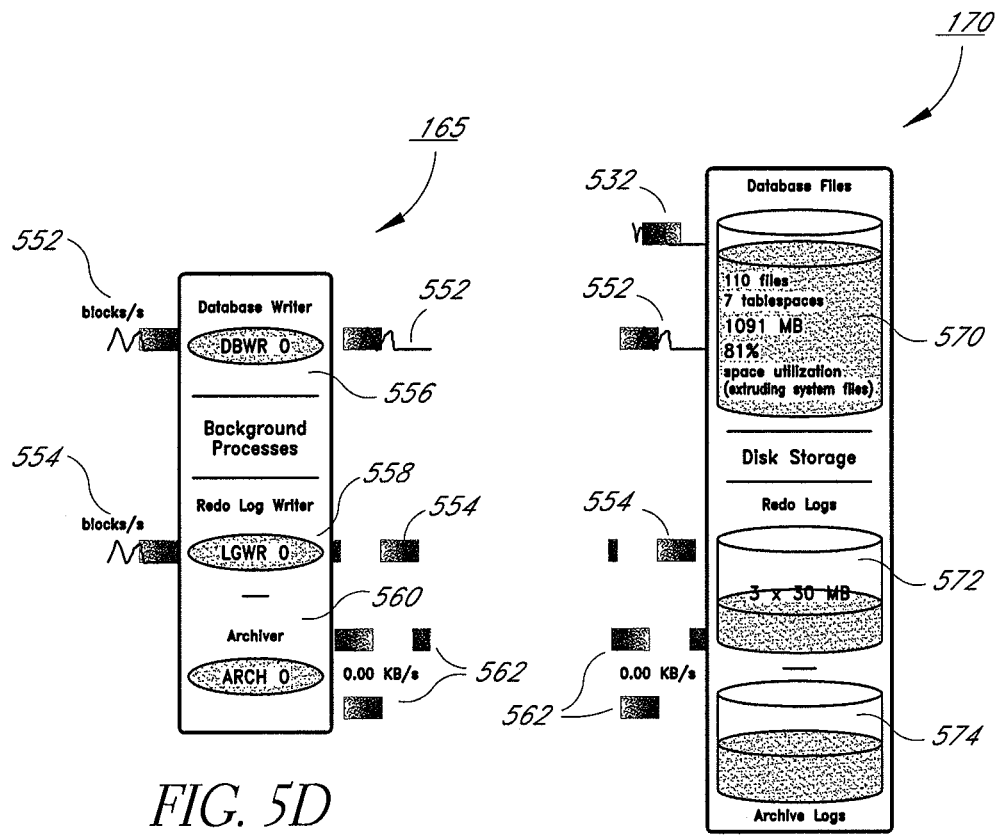

FIG. 5D illustrates the background processes panel 165. The background processes panel 165 represents the status of the background or housekeeping processes for the DBMS 300, such as, for example, the DBWR process 340, the LGWR process 350, or the ARCHIVER process 365. As shown in FIG. 5D, the background processes panel 165 includes a DBWR process icon 556, a LGWR process icon 558, and an ARCHIVER process icon 560. The DBWR process icon 556 employs the color caution levels to indicate that the DBWR process 340 is causing delays to other processes. Moreover, the LGWR process icon 558 employs the color caution levels to indicate that a log switch is occurring between the active and inactive redo logs, 345 and 355, or, on the other hand, when the average time the LGWR process 350 uses to copy the redo log entries to the active redo log 345 is above a threshold. The ARCHIVER process icon 560 represents the existence or number of ARCHIVER processes 365 active in the DBMS 300.

The background process panel 165 also includes the dataflows 552 and 554. These dataflows are passed through the background processes panel 165 to the disk devices panel 170. Moreover, the background process panel 165 includes dataflows 562 representing the rate the ARCHIVER process 365 copies the inactive redo log 355 to the archived log destination 360.

FIG. 5E illustrates the disk devices panel 170. The disk devices panel 170 represents the status of the data files of the DBMS 300. For example, the data files include the database files 335, the redo logs 345 and 355, and the archive log destination 360. As shown in FIG. 5E, the disk devices panel 170 includes a database file disk icon 570, a redo log disk icon 572, and an archived log disk icon 574. The database file disk icon 570, the redo disk icon 572, and the archived log disk icon 573 include a fill level corresponding to the respective utilization of available space for each database file. In addition, the disk devices panel 170 also includes the dataflows 532, 552, 554, and 562.

Although the panels of FIG. 5A-5E are disclosed with reference to certain embodiments, the invention is not intended to be limited thereby. Rather, a skilled artisan will recognize from the disclosure herein a wide number of alternatives for on-screen graphics representing characteristics of the application components. In addition, the color caution levels may also advantageously be replaced by or include a wide variety of alerting mechanisms. For example, the monitoring system 220 may advantageously incorporate audio alarms, other visual or audio indications, paging or wireless cell or satellite phone alerts, or the like.

Figure 6:
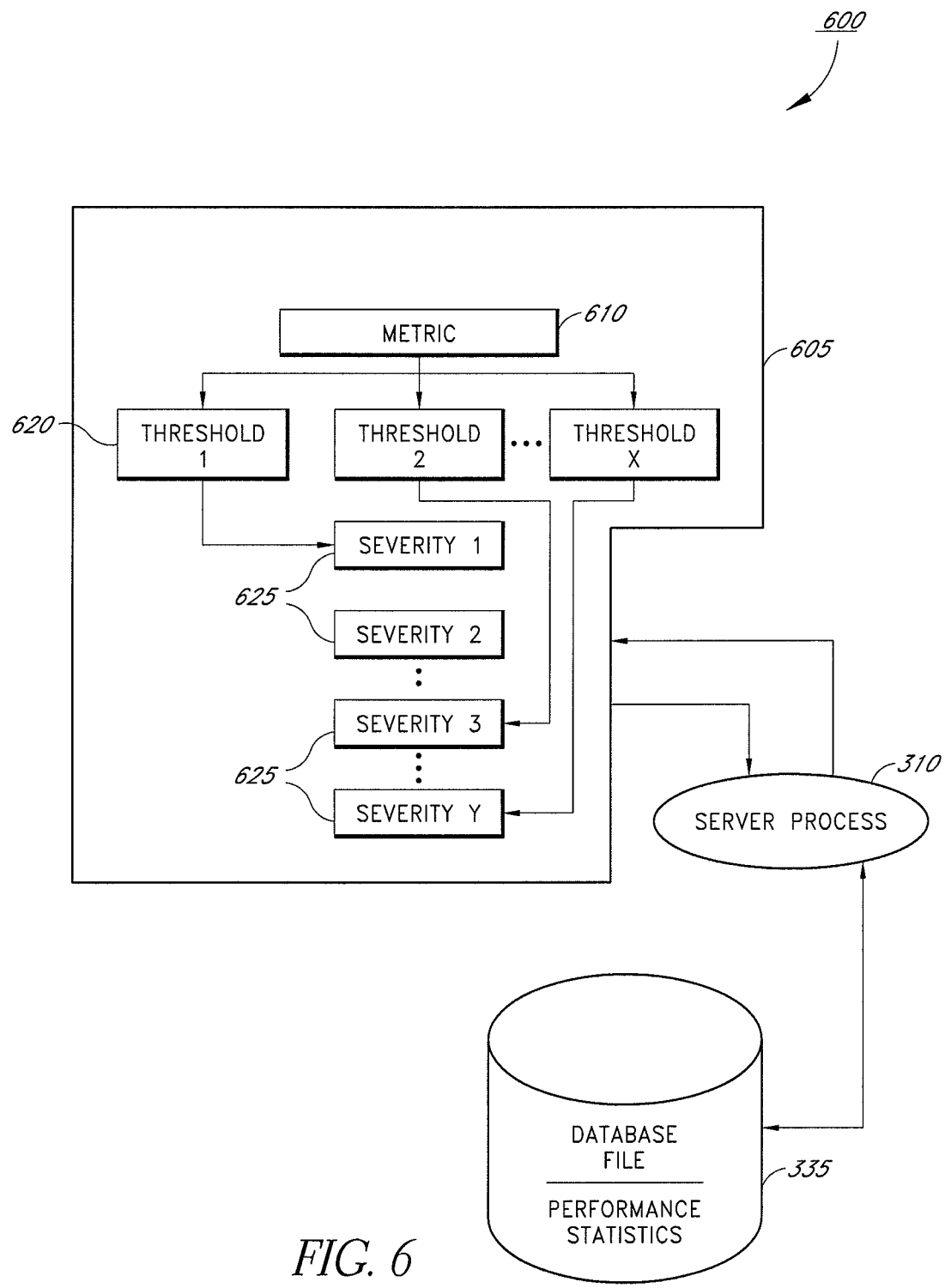
FIG. 6 illustrates a block diagram of an alert firing mechanism, according to aspects of an embodiment of the invention.

FIG. 6 illustrates a block diagram of an alert firing mechanism 600, according to aspects of an embodiment of the invention. As shown in FIG. 6, the alert firing mechanism 600 includes an on-screen graphic 605, such as the foregoing alphanumeric textual information, the icons 135, the dataflows 140, the panels 145 and the like. The on-screen graphic 605 communicates with the server process 310 of the DBMS 300 such that the server process 310 returns performance statistics, stored in the database files 335, relevant to the on-screen graphic 605.

The performance statistics include one or more values relating to the performance of the application component represented by the on-screen graphic 605. The foregoing one or more values are loaded into a metric memory structure, referred to as a metric 610, associated with the on-screen graphic 605. The metric 610 compares the one or more values to one or more thresholds 620 corresponding to one or more severities 625. Each threshold 620 corresponds to a range of values available for the metric 610. Each severity 625 corresponds to one or more actions for the on-screen graphic 605. Thus, when the metric 610 falls within one of the thresholds 620, the associated severity 625 dictates the action of the on-screen graphic 605. For example, as discussed in the foregoing, the meter icon 505 represents the number of active users as a percentage of total users of the DBMS 300. Thus, one on-screen graphic 605 includes the meter icon 505.

In addition, the server process 310 may return a value of active users and a value of total users as performance statistics. The metric 610 then determines the percentage of active users, by dividing the number of active users by the number of total users, and compares that percentage to the thresholds 620. When the metric 610 is a high enough percentage, the metric 610 may fall into the threshold 620 corresponding to the severity 625 for changing the color of the meter icon 505 from green to yellow, thereby indicating an increased caution level to the user of the monitoring device 220.

The severities 625 include changes of colors corresponding to the foregoing color caution levels, changes of the speed of dataflows 140, changes of textual values, and the like. Moreover, the severities 625 may also include other forms of alerting the user, such as, for example, sending an email, sounding an alarm, paging, voice mailing, or otherwise visually or audibly alerting the user to potential or actual problems. Moreover, as shown in FIG. 6 and according to an embodiment of the invention, the thresholds 620 may skip one or more severities 625, thereby advantageously providing a more drastic action to the on-screen graphic 605 corresponding to a change in the threshold 620 that the metric 610 falls into.

Figure 7:
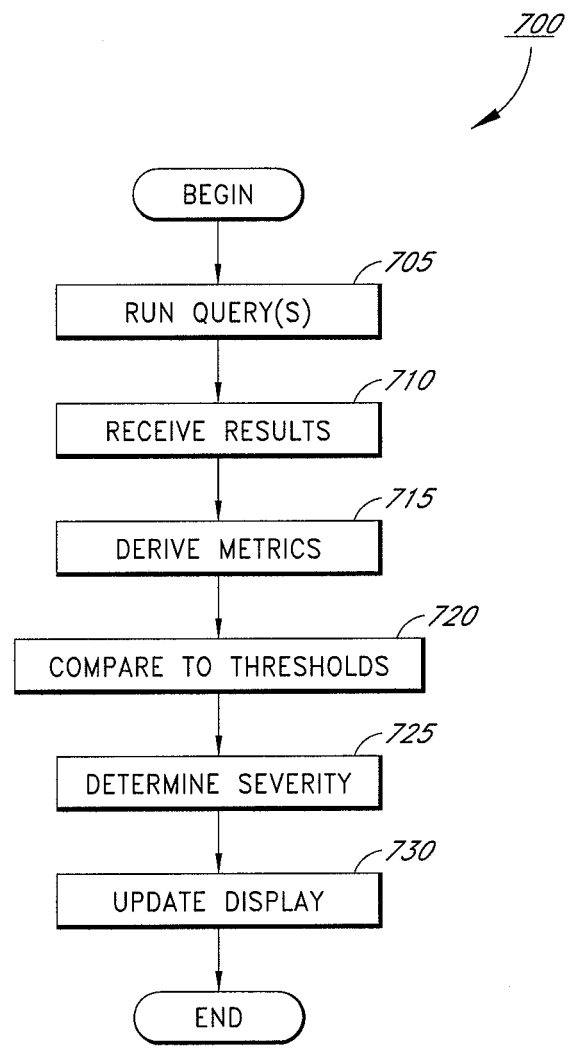
FIG. 7 illustrates a flow chart of the alert firing process of the alert firing mechanism of FIG. 6.

FIG. 7 illustrates a flow chart of an alert firing process 700 employing the alert firing mechanism 600 of FIG. 6. According to the another embodiment, the alert firing process 700 begins with STEP 705 where the monitoring system 220 queries the server process 310 to retrieve performance statistics relating to a wide number of application components. The server process 310 returns the values of the performance statistics, which, at STEP 710 are received by the monitoring system 220. At STEP 715, the monitoring system 220 derives the metrics 610 from the performance statistics. For example, the monitoring system 220 may advantageously derive the foregoing percentage of active users from the total number of users, the number of active users, the rate of I/O per second from the preceding two total I/O counters; or the percentage of time processes spent in various wait states. According to one embodiment, several of the foregoing derivations are subjected to a moving average algorithm to smooth out momentary short-term fluctuations.

At STEP 720, the monitoring system 220 compares the metrics 610 with their respective threshold values 620 in order to determine the corresponding severity 625. That determination, made during STEP 725 provides the actions to be taken with respect to the respective on-screen graphics 605. At STEP 730, the monitoring system GUI 100 updates the on-screen graphics to reflect their current severities 625.

Although the monitoring system 220 is disclosed with reference to certain embodiment, the invention is not intended to be limited thereby. Rather, a skilled artisan will recognize from the disclosure herein a wide number of alternatives. For example, the thresholds 620 and the severities 625 may advantageously be self-calibrating for varying system architectures. Such self-calibration may advantageously comprise executing the monitoring system 220 for a predetermined time interval, and then setting the thresholds 620 as percentage increases or decreases from the performance statistics measured during the time interval. In addition, the calibration, or default settings for the thresholds 620, may be customizable by direct user interaction. Moreover, the severities 625 may be customizable by direct user assignment thereof to respective thresholds 620.

As mentioned in the foregoing, the monitoring system 220 may advantageously monitor applications other than the DBMS 300, or a DBMS 300 having application components differing from those of FIG. 3. In both cases, a skilled artisan will recognize from the disclosure herein that the on-screen graphics may be advantageously modified to represent those differing application level components.

In addition, a skilled artisan will recognize from the disclosure herein that the monitoring system may advantageously access some or all of the performance statistics through, for example, an open application program interface (API) of the application being monitored. On the other hand, a skilled artisan will recognize from the disclosure herein that the monitoring system 220 may also employ software modules designed to extract some or all of the performance statistics without accessing or calling the API. By avoiding a call to the API, the software modules extract the performance statistics without adding significant program loads to the application, thereby advantageously allowing for more frequent polling, more precise polling, or both.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

What is claimed is:

1. A method of monitoring a computing environment, the method comprising:
providing on a user interface with one or more computer processors first on-screen graphics that represents at least an active redo log and an inactive redo log associated with a computer database program, wherein the first on-screen graphics indicates availability of at least the active redo log;
modifying a graphical attribute of the first on-screen graphics when a log switch occurs between the active and inactive redo logs; and
providing on the user interface with one or more computer processors second on-screen graphics representing an amount of data flow associated with copying the inactive redo log to an archive.

2. The method of claim 1, further comprising third on-screen graphics depicting one or more archive log destinations.

3. The method of claim 1, additionally comprising modifying a graphical attribute of the second on-screen graphics when the represented amount of data flow changes.

4. The method of claim 1, further comprising modifying the graphical attribute of the first on-screen graphics when performance reaches a predetermined caution level.

5. The method of claim 4, wherein modifying the graphical attribute comprises changing a color.

6. The method of claim 1, wherein the first on-screen graphics depict operation of an archiver process associated with the inactive redo log.

7. The method of claim 1, further comprising on-screen graphics associated with at least one disk.

8. The method of claim 1, wherein the second on-screen graphics further represent a fault amount.

9. The method of claim 1, wherein the second on-screen graphics further represent an amount of cache reads or writes.

10. An executable computer program stored in a non-transitory computer readable medium for monitoring performance statistics of a computing environment, the computer program comprising:
software executing in one or more computer processors, the software configured to display on an interface, first on-screen graphics representing at least an active redo log and an inactive redo log, wherein the first on-screen graphics indicates at least the availability of the active redo log; and
wherein the software is further configured to modify a graphical attribute of the first on-screen graphics when a log switch occurs between the active and inactive e redo logs; and
wherein the software is further configured to display on the interface second on-screen graphics representing an amount of data flow associated with copying the inactive redo log to an archive.

11. The computer program of claim 10, wherein the software is further configured to display in panels application components having similar functionality.

12. The computer program of claim 11, further comprising third on-screen graphics depicting one or more archive log destinations.

13. The computer program of claim 10, wherein the processor is a server processor.

14. The computer program of claim 10, further comprising plurality of threshold parameters that comprise a hierarchy of caution levels, each of which corresponds to a different graphical attribute.

15. The computer program of claim 14, wherein the second graphical attribute comprises at least one of size, color, texture, text, blinking, existence, speed, acceleration, value, sound, rotation, animation and content.

16. The computer program of claim 10, further comprising a third on-screen graphics that depicts a fault.

17. The computer program of claim 10, further comprising the depiction of at least one disk.

18. The computer program of claim 10, further comprising a plurality of threshold parameters that are programmable by a user.

* * * * *